United States Patent
You et al.

(10) Patent No.: US 11,750,130 B2
(45) Date of Patent: *Sep. 5, 2023

(54) METHOD OF CONTROLLING SENSORLESS MOTOR FOR AIR COMPRESSOR

(71) Applicants: HYUNDAI MOTOR COMPANY, Seoul (KR); KIA MOTORS CORPORATION, Seoul (KR)

(72) Inventors: Chang Seok You, Hwaseong-si (KR); Sung Do Kim, Seoul (KR); Min Su Kang, Paju-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 181 days.

This patent is subject to a terminal disclaimer.

(21) Appl. No.: 17/010,146

(22) Filed: Sep. 2, 2020

(65) Prior Publication Data

US 2021/0104968 A1 Apr. 8, 2021

(30) Foreign Application Priority Data

Oct. 8, 2019 (KR) .................. 10-2019-0124272

(51) Int. Cl.
| | |
|---|---|
| *H02P 21/24* | (2016.01) |
| *F04D 27/00* | (2006.01) |
| *F04D 25/06* | (2006.01) |
| *H02P 21/18* | (2016.01) |
| *H02P 21/32* | (2016.01) |
| *F04B 49/06* | (2006.01) |

(52) U.S. Cl.
CPC ............... *H02P 21/24* (2016.02); *F04B 49/06* (2013.01); *F04D 25/06* (2013.01); *F04D 27/004* (2013.01); *H02P 21/18* (2016.02); *H02P 21/32* (2016.02); *H02P 2203/03* (2013.01); *Y02B 30/70* (2013.01); *Y02E 60/50* (2013.01)

(58) Field of Classification Search
CPC .......... H02P 21/24; H02P 21/18; H02P 21/32; H02P 21/22; H02P 2203/03;
(Continued)

(56) References Cited

U.S. PATENT DOCUMENTS

| | | | |
|---|---|---|---|
| 2003/0030406 A1* | 2/2003 | Takahashi | B60L 15/025 318/714 |
| 2005/0007044 A1* | 1/2005 | Qiu | G05B 13/048 318/717 |

(Continued)

FOREIGN PATENT DOCUMENTS

| | | |
|---|---|---|
| JP | H11-275884 A | 10/1999 |
| JP | 2002-325481 A | 11/2002 |

(Continued)

*Primary Examiner* — Philip E Stimpert
(74) *Attorney, Agent, or Firm* — McDonnell Boehnen Hulbert & Berghoff LLP

(57) ABSTRACT

Provided is a method of controlling a sensorless motor for an air compressor. The method controls early driving of a sensorless motor for an air compressor, overcomes related-art problems, and improves control response. A position of a rotor of the motor, finally estimated by a sensorless control logic at a point in time at which the motor is determined to be in the stopped state, is determined to be an alignment target position. An alignment start position is determined from the alignment target position in accordance with a predetermined alignment offset angle. The position of the rotor of the motor is controlled to change from the determined alignment start position to the alignment target position.

12 Claims, 19 Drawing Sheets

(58) Field of Classification Search
CPC ............. H02P 2203/00; H02P 2203/01; H02P 2203/11; H02P 6/21; H02P 6/18; H02P 8/08; F04D 25/06; F04D 25/0606; F04D 27/001; F04D 27/004; F04D 15/0066; Y02B 30/70; Y02E 60/50; F04B 49/06; H01M 8/04089; H01M 8/04395; H01M 8/04753; H01M 8/04111; H01M 2250/20

See application file for complete search history.

(56) References Cited

U.S. PATENT DOCUMENTS

| | | | | |
|---|---|---|---|---|
| 2010/0156333 | A1* | 6/2010 | Chen | B60W 10/06 |
| | | | | 318/400.33 |
| 2010/0277112 | A1* | 11/2010 | Jeong | H02P 6/20 |
| | | | | 318/400.11 |
| 2013/0043816 | A1* | 2/2013 | Welchko | H02M 1/32 |
| | | | | 318/400.21 |
| 2014/0070747 | A1* | 3/2014 | Siddalingappa | H02P 21/32 |
| | | | | 318/400.33 |
| 2018/0131305 | A1* | 5/2018 | Wang | H02P 6/04 |
| 2018/0167009 | A1* | 6/2018 | Suzuki | H02P 6/17 |
| 2019/0344671 | A1* | 11/2019 | Shin | B60W 20/00 |
| 2021/0028734 | A1* | 1/2021 | You | H02P 21/36 |

FOREIGN PATENT DOCUMENTS

| | | |
|---|---|---|
| JP | 2003-514507 A | 4/2003 |
| JP | 2007-181352 A | 7/2007 |
| JP | 2013-017352 A | 1/2013 |

* cited by examiner

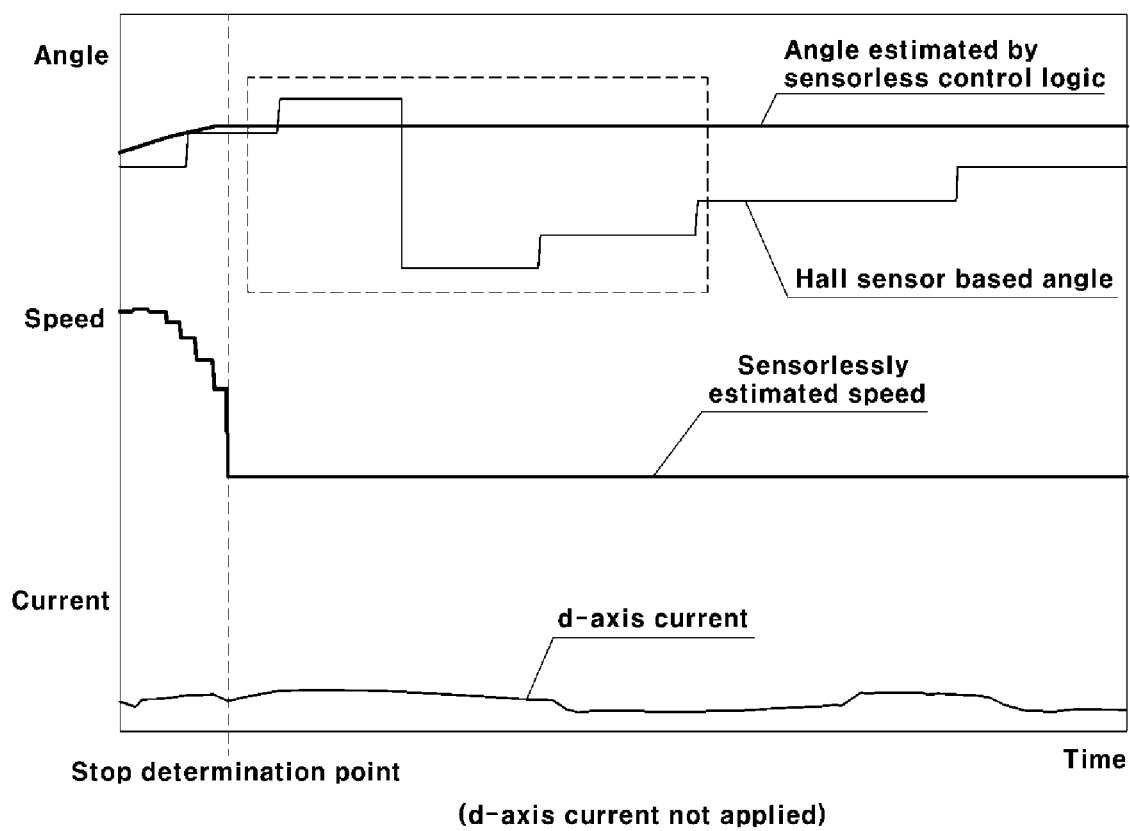

METHOD OF CONTROLLING SENSORLESS MOTOR FOR AIR COMPRESSOR

CROSS REFERENCE TO RELATED APPLICATIONS

The present application claims priority to Korean Patent Application No. 10-2019-0124272, filed Oct. 8, 2019, the entire contents of which is incorporated herein for all purposes by this reference.

BACKGROUND

Field

The present disclosure relates generally to a method of controlling a sensorless motor for an air compressor and, more particularly, to a method of controlling early driving of a sensorless motor for an air compressor, the method being able to overcome problems of related-art sensorless control methods and to improve control response.

Description of the Related Art

A fuel cell system is applied to a hydrogen fuel cell vehicle among eco-friendly vehicles. The fuel cell system includes a fuel cell stack, a hydrogen supply unit, an air supply unit, a heat and water management system, and a control unit. The fuel cell stack generates electric energy by electrochemical reaction of reaction gases (i.e. hydrogen acting as a fuel gas and oxygen acting as an oxidizing gas). The hydrogen supply unit supplies hydrogen acting as the fuel gas to the fuel cell stack. The air supply unit supplies air including oxygen to the fuel cell stack. The heat and water management system controls the operating speed of the fuel cell stack and performs a water management function. The control unit controls the overall operation of the fuel cell system.

FIG. 1 is a view illustrating the configuration of a fuel cell system known in the art.

In the fuel cell system, an oxygen supply unit 10 includes a hydrogen storage (e.g. a hydrogen tank, not shown), a regulator (not shown), a hydrogen supply line 11, a hydrogen pressure control valve (also referred to as a "hydrogen supply valve") 12, a hydrogen pressure sensor 13, a hydrogen recirculator 15, and the like.

In addition, an air supply unit 20 includes an air supply line 21, a filter 22, an air blower or air compressor 23, a humidifier 24, and the like. A heat and water management system 30 includes a water trap 31, a drain valve 32, and the like, in addition to components, such as an electric water pump (a cooling water pump), a water tank, a radiator, and a 3-way valve, which are not shown in the drawings.

Regarding the hydrogen supply unit 10 supplying hydrogen, i.e. fuel, to a fuel cell stack 1, high-pressure hydrogen supplied from the hydrogen tank by the hydrogen supply unit 10 is decompressed to a predetermined pressure by the regulator before being supplied to the fuel cell stack 1.

When hydrogen decompressed by the regulator is supplied, the amount of hydrogen is controlled by pressure control depending on the operating condition of the fuel cell stack 1. The degree of opening of a hydrogen pressure control valve or a fuel supply valve (FSV) 12 provided on the hydrogen supply line 11 is controlled depending on required output, so that a necessary amount of hydrogen is supplied to the fuel cell stack 1.

Here, a fuel cell control unit (FCU, not shown) controls the degree of opening of the hydrogen pressure control valve 12 by receiving a sensing value fed back from the hydrogen pressure sensor 13, disposed on the hydrogen supply line, in order to control the pressure and amount of hydrogen.

In addition, after reaction in the fuel cell stack 1, a residual amount of unreacted hydrogen is discharged through an output terminal of an anode (or a hydrogen electrode or fuel electrode) or recirculated to a stack anode input terminal by the hydrogen recirculator 15.

The hydrogen recirculator 15 is intended to allow the unreacted hydrogen to be reused. The hydrogen recirculator 15 includes a recirculation line 16 extending from an exhaust line 14, provided in an anode output side of the fuel cell stack 1, to an anode input side.

In addition, the hydrogen recirculator 15 includes an ejector 17 or a recirculation blower or the ejector and the recirculation blower taking in the unreacted hydrogen through the recirculation line 16 and supplying the unreacted hydrogen to the fuel cell stack 1.

In addition, a purge valve 18 for purging the anode side is disposed on the anode output side of the fuel cell stack 1. The purge valve 18 is periodically operated to be opened and closed so that impurities, such as nitrogen and water, are discharged and removed from the anode of the fuel cell stack 1 along with hydrogen. Accordingly, the rate of usage of hydrogen is improved.

Although not shown in the drawings, the fuel cell control unit (FCU) not only controls the operating pressure of hydrogen by controlling the degree of opening of the hydrogen pressure control valve 12, but also controls the values 18 and 32 in the air compressor 23, the air blower, and the other components of the system.

Recently, as the performance of fuel cell vehicles has been further improved, output power required for fuel cells serving as a power source of a vehicle is also increasing.

Thus, an air compression ratio and a required flow rate in the air compressor 23 supplying air to the fuel cells are also increasing. The maximum speed of the motor for compressing air in the air compressor for this purpose is also required to be increased.

However, increasing the maximum speed of the motor in the air compressor 23 may have the following problems.

The motor of the air compressor generates a large amount of heat when operating at a high speed. Since the motor is vulnerable to heat, cooling for lowering the temperature of the motor is essentially required.

However, cooling performance provided by a vehicle is limited, and thus, the ability to lower the temperature of the motor of the air compressor is limited.

Furthermore, the air compressor further includes a Hall sensor, i.e. a position sensor, to control the position of the motor. However, the Hall sensor is vulnerable to heat.

Thus, as described above, with increases in the speed of the motor of the air compressor, the motor generates a greater amount of heat. As the temperature of the motor increases, the use of the Hall sensor may be limited.

In this regard, it is required to omit the Hall sensor and obtain sensorless control technology. If the air compressor can be driven without the Hall sensor, degree criteria in consideration of cooling performance may be lowered, thereby reducing costs for the air compressor.

In related-art sensorless control, a method of estimating a position, angle, and speed of the motor by estimating counter electromotive force of the motor has been generally used.

However, in the related art, when the motor starts to be driven at an early stage, counter electromotive force is not generated, and thus, the initial position of the motor cannot be determined.

In this regard, at an early stage in which the driving of the motor is resumed after being stopped, a motor speed may be generated by performing open-loop control for several hundreds of ms, and afterwards, sensorless control may be performed on the basis of counter electromotive force.

However, performing the open-loop control for several hundreds of ms as above may be a drawback in consideration of driving characteristics of the air compressor in which response is regarded important.

SUMMARY

Accordingly, the present disclosure has been made keeping in mind the above problems occurring in the related art, and the present disclosure proposes a method of controlling a sensorless motor for an air compressor and, more particularly, to a method of controlling early driving of a sensorless motor for an air compressor, the method being able to overcome problems of related-art sensorless control methods and to improve control response.

In order to achieve the above objective, according to one aspect of the present disclosure, there is provided a method of controlling a sensorless motor for an air compressor. The method may include performing, by a controller, speed control to stop a motor of an air compressor, determining, by the controller, that the motor is in a stopped state in accordance with a speed of the motor estimated by a sensorless control logic while the speed control is being performed, determining, by the controller, a position of a rotor of the motor, finally estimated by a sensorless control logic at a point in time at which the motor is determined to be in the stopped state, to be an alignment target position, determining, by the controller, an alignment start position from the alignment target position in accordance with a predetermined alignment offset angle, controlling, by the controller, the position of the rotor of the motor to change from the determined alignment start position to the alignment target position, and performing, by the controller, sensorless control to drive the motor by setting the alignment target position to be an initial position in response to a motor drive request, in a state in which the position of the rotor of the motor is aligned to the alignment target position.

In the determination that the motor is in the stopped state, the controller may determine that the motor is in the stopped state if the speed of the motor estimated by the sensorless control logic reaches a predetermined reference speed.

In addition, the reference speed may be determined by the controller to be a speed greater than 0 rpm.

In addition, in the determination of the alignment start position, the controller may determine the alignment start position by subtracting the alignment offset value from the predetermined alignment target position in a direction opposite to a direction of rotation of the rotor.

In addition, in the controlling of the position of the rotor of the motor to change, the controller may control a current applied to the motor to forcibly rotate the rotor for a predetermined forced rotor rotation time so that the position of the rotor of the motor changes from the alignment start position to the alignment target position.

Here, the current may be a phase current, and the controller may control a phase of a phase current applied to the motor so that the position of the rotor of the motor changes from the alignment start position to the alignment target position for the forced rotor rotation time.

In addition, the controller may control the phase of the phase current applied to the motor so that the position of the rotor of the motor linearly changes at a predetermined rate of change.

In addition, in the controlling of the position of the rotor of the motor to change, the controller may apply a d-axis current for moving the position of the rotor of the motor from the alignment start position to the alignment target position for a predetermined position alignment time from the point in time at which the motor is determined to be in the stopped state, and after passage of the forced rotor rotation time from the point in time at which the motor is determined to be in the stopped state, stop controlling the phase of the phase current while the d-axis current is being applied before passage of the position alignment time.

In addition, the controller may apply the current to the motor so that the position of the rotor of the motor changes at a predetermined rate of change from the alignment start position to the alignment target position.

In addition, in the controlling of the position of the rotor of the motor to change, the controller may apply a d-axis current to change the position of the rotor of the motor from the alignment start position to the alignment target position for a predetermined position alignment time.

In addition, the air compressor may be an air compressor for a fuel cell system, configured to supply air to a fuel cell stack.

As set forth above, the method of controlling a sensorless motor for an air compressor according to the present disclosure can improve speed control response at an early stage of the driving of the air compressor, thereby improving air supply response, stack output response, and vehicle acceleration performance of a fuel cell stack.

In addition, it is possible to obtain speed control reliability at an early stage of the driving when the driving of the motor is resumed after being stopped. Accordingly, it is possible to prevent application of torque in an unnecessary position, thereby improving driving efficiency of the motor and fuel efficiency of the vehicle.

Furthermore, the method of controlling a sensorless motor for an air compressor according to the present disclosure can overcome a rotor alignment failure problem in that a rotor may not be aligned to an intended position when the position of the rotor is aligned to a final position estimated by a sensorless control logic when the motor is stopped.

BRIEF DESCRIPTION OF THE FIGURES

The above and other objectives, features, and advantages of the present disclosure will be more clearly understood from the following detailed description when taken in conjunction with the accompanying drawings, in which:

FIG. 7B is a view illustrating a case in which a d-axis current is not applied;

DETAILED DESCRIPTION

Hereinafter, embodiments of the present disclosure will be described in detail with reference to the accompanying drawings, so that those skilled in the art to which the present disclosure relates could easily put the present disclosure into practice. However, the present disclosure is not limited to the following embodiments and may be embodied in many different forms.

It will be understood that the terms "comprise", "include", "have", and any variations thereof used herein are intended to cover non-exclusive inclusions unless explicitly described to the contrary.

The present disclosure relates to a method of controlling a sensorless motor for an air compressor and, more particularly, to a method of controlling early driving of a sensorless motor for an air compressor, the method being able to overcome problems of related-art sensorless control method and to improve control response.

Figure 1:
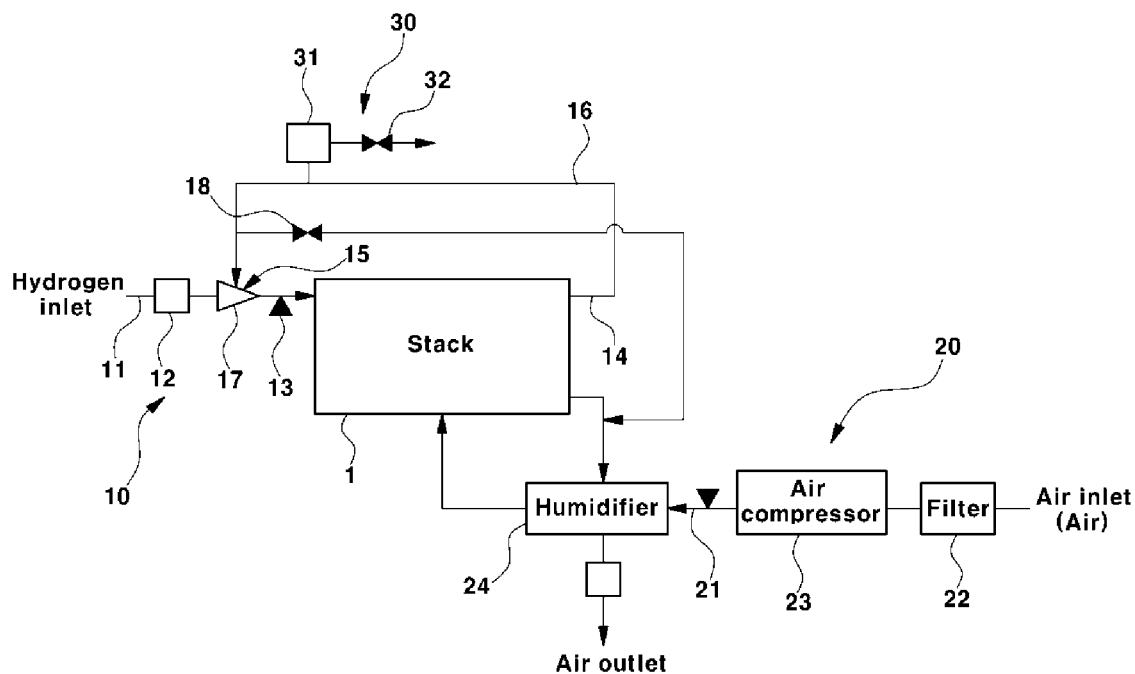
FIG. 1 is a view illustrating the configuration of a fuel cell system known in the art.

The control method according to the present disclosure can be used to control the sensorless motor for the air compressor. Herein, the air compressor may be the air compressor designated by reference numeral "23" in FIG. 1 supplying air to the fuel cell stack designated by reference numeral "1" in FIG. 1.

Hereinafter, the motor is a motor of the air compressor, the speed of the air compressor is the speed of the motor, and position and angle of the motor are the rotational position and the rotational angle of a rotor of the motor.

In addition, hereinafter, braking means braking the motor to stop the motor, and position alignment means aligning and fixing the rotor at a predetermined position.

Related-Art Sensorless Control Method

First, a known sensorless control method will be briefly described for a better understanding of the present disclosure.

Figure 2:
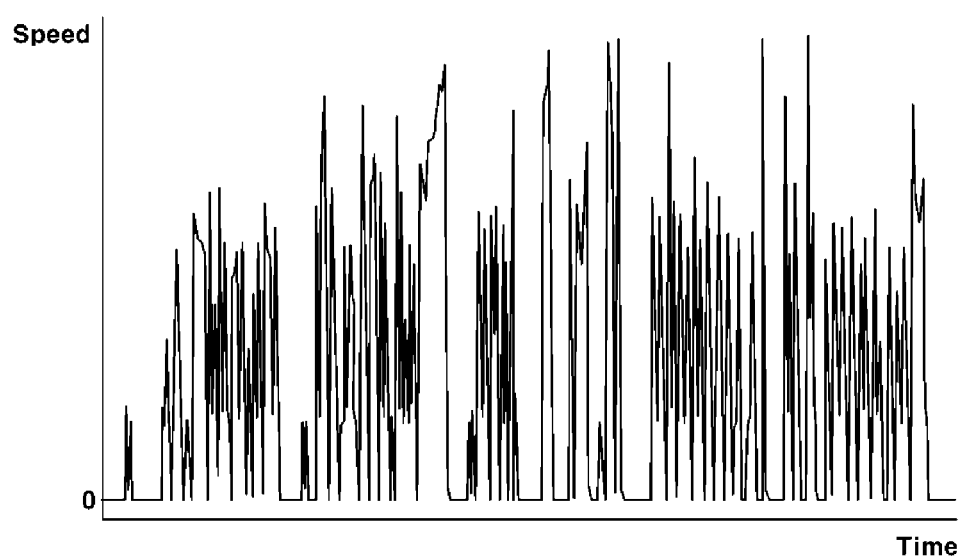
FIG. 2 is a graph illustrating acceleration and deceleration of a typical air compressor during travel of a fuel cell vehicle.

FIG. 2 is a graph illustrating acceleration and deceleration of a typical air compressor during travel of a fuel cell vehicle. As illustrated in FIG. 2, the speed of the air compressor repeats rapid acceleration and deceleration depending on the acceleration and deceleration driving pattern of a driver.

In addition, air supply response of the fuel cell stack is determined on the basis of speed control response of the air compressor, and acts as a key factor for response performance of the output of the stack.

Accordingly, since acceleration performance of the vehicle is determined depending on the response performance of the output of the stack, the speed control response of the air compressor is a key factor during driving of a fuel cell vehicle.

Referring to FIG. 2, it is apparent that the acceleration and deceleration of the air compressor very frequently occurs during driving, and that the driving of the motor of the air compressor is repeatedly stopped and resumed.

That is, if a short period of time in which the driving of the motor is resumed after being stopped is referred to as an early driving situation of the motor, the occurrence of the early driving situation of the motor is significantly frequent.

When the motor speed of the air compressor is controlled depending on the acceleration and deceleration pattern illustrated in FIG. 2, the stopping and resumption of the driving of the motor frequently occurs. According to the related-art sensorless control, open-loop control must be performed at every early stage whenever the driving is resumed.

Figure 3:
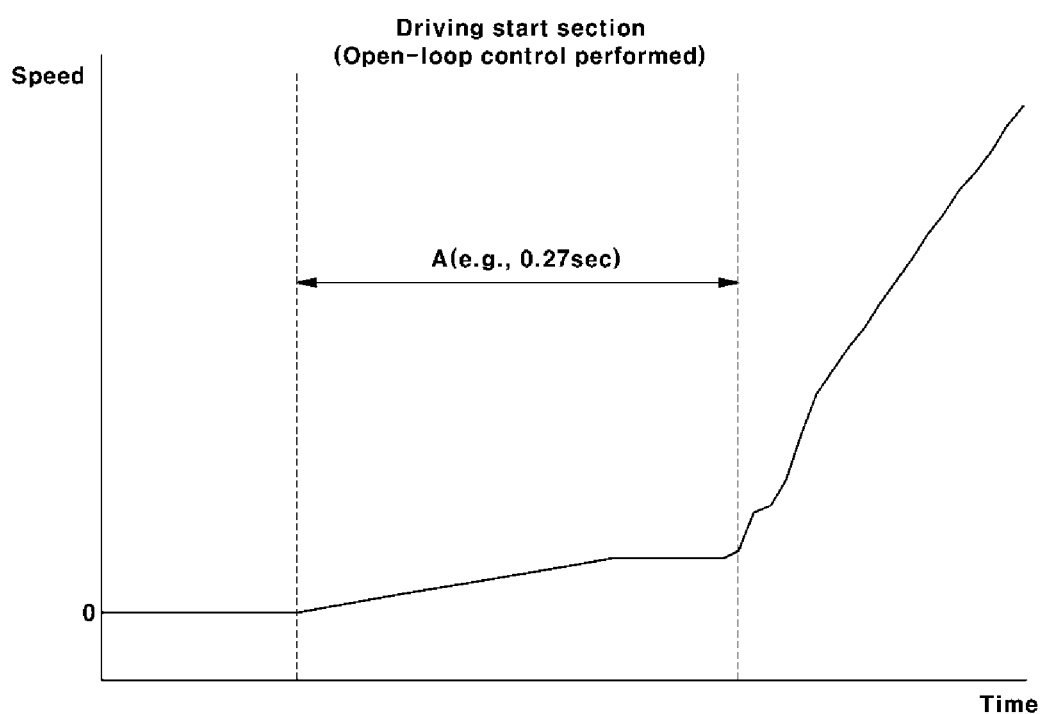
FIG. 3 is a graph illustrating motor speeds at an early stage during open-loop control and driving in a control process of the related art.

When a known sensorless control process is performed by counter electromotive force, speed control at an early stage of motor driving is performed as illustrated in FIG. 3.

FIG. 3 is a graph illustrating motor speeds at an early stage during open-loop control and driving in a known control process. In an air compressor without a Hall sensor (i.e. a position sensor) and a control system thereof, the open-loop control over a stopped motor is started at an early stage of driving.

The open-loop control is performed at the early stage of the driving in a case in which the driving of the motor is resumed after being stopped. Since the counter electromotive force is not generated in the stopped state of the motor, without the Hall sensor for detecting the position of the motor, it is impossible to estimate the initial position of the motor only by a related-art sensorless control logic.

That is, in the sensorless control logic estimating the position and speed of the motor by counter electromotive force, only after the motor is driven to reach a predetermined motor speed, the position of the motor can be estimated by counter electromotive force generated at the predetermined motor speed. Accordingly, when the driving of the motor is resumed, the rotor of the motor is rotated using a magnetic field by generating the magnetic field in a predetermined position in the stopped state at the early stage of the driving, so that a predetermined or higher speed of the motor is provided.

In FIG. 3, reference numeral "A" indicates a period of time of a driving start section. The section A is the driving start section, in which open-loop control over the motor and the early stage of the driving of the motor are performed. In FIG. 3, open-loop control is performed for 0.27 seconds in order to promote stabilization at the early stage of the driving of the motor.

Referring to FIG. 3, it is apparent that, after the section A, the driving of the motor is succeeded and the speed of the motor is rapidly increased.

When the motor of the air compressor is started from the stopped state of the sensorless system as described above, open-loop control causes the motor to rotate in a predetermined or higher speed, even though the open-loop control is performed for a short period of time at an early stage.

For example, the open-loop control is performed for average 0.27 seconds from the stopped state. A driving delay corresponding to a period of time of the open-loop control is present after a motor drive instruction is directed.

Regarding respond standard of the air compressor, a period of time before reaching a highest speed (e.g. 100,000 rpm) is about 1 second or less. Accordingly, the open-loop control and the driving delay for 0.27 seconds are factors of lowering the response performance by about 30%.

FIGS. 4A to 4D are graphs illustrating motor speeds in a case in which open-loop control is omitted at an early stage of the driving of the motor. FIGS. 4A to 4D are intended to illustrate problems when the open-loop control is omitted.

FIGS. 4A to 4D illustrate a case in which motor speed control is performed by driving the sensorless control logic by omitting open-loop control, i.e. a response lowering factor.

As illustrated in FIGS. 4A to 4D, when the sensorless control logic is directly performed in a state in which the position at the early stage of the driving is not determined, speed-instability oscillation may occur for 100 ms, and intended speed control may be started after speed oscillation for a short period of time.

This is because the driving of the rotor is not synchronized with torque applied by a magnetic field generated from a position unrelated to the position of the rotor. Accordingly, while the magnetic field rotates once, the rotor is not driven, and the speed estimated by the sensorless control logic has a noise value.

Figure 4A:
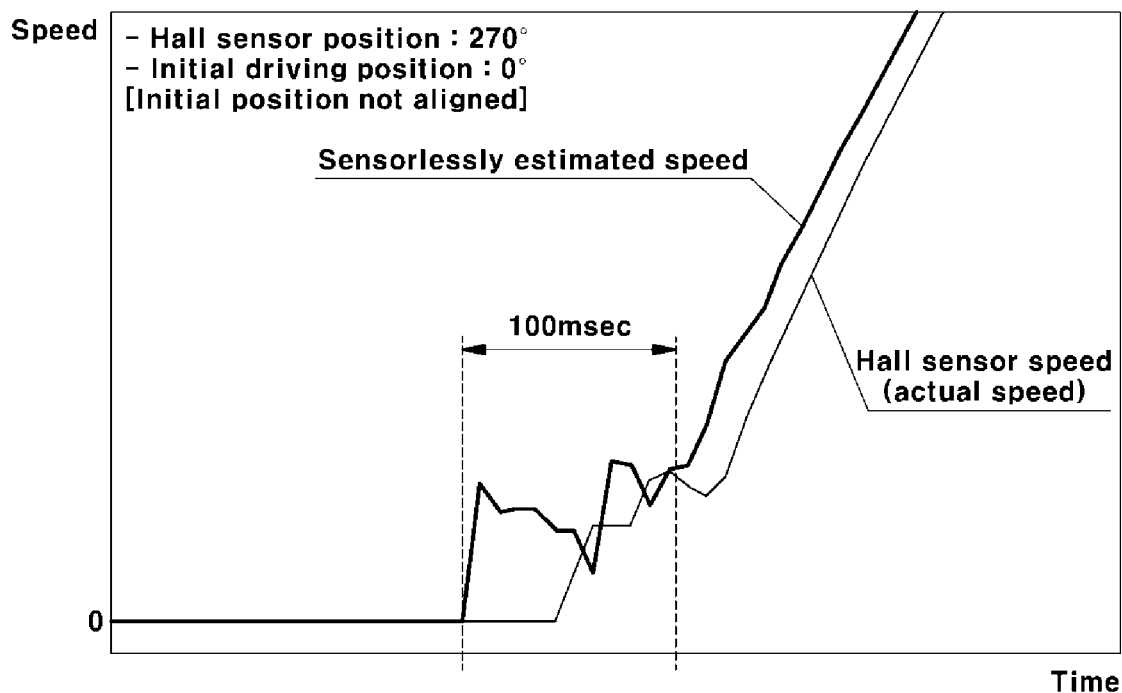
FIGS. 4A, 4B, 4C, and 4D are graphs illustrating motor speeds in a case in which open-loop control is omitted at an early stage of the driving of the motor.
Figure 4B:
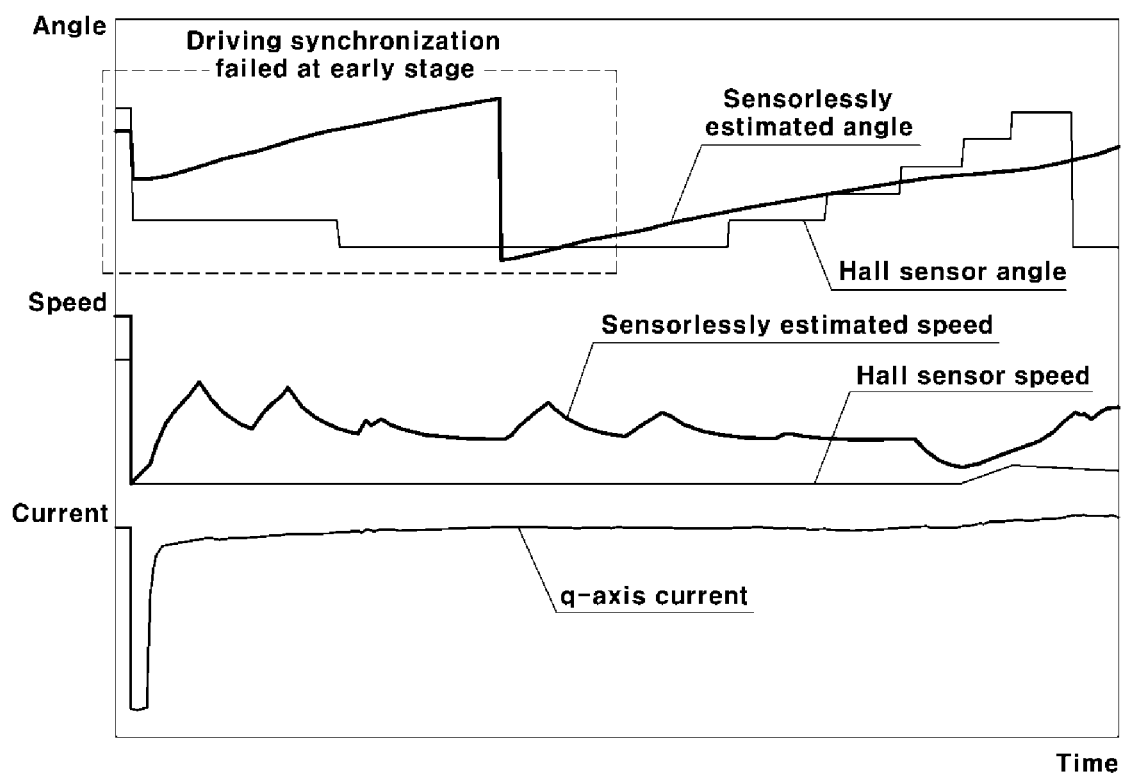
Figure 4C:
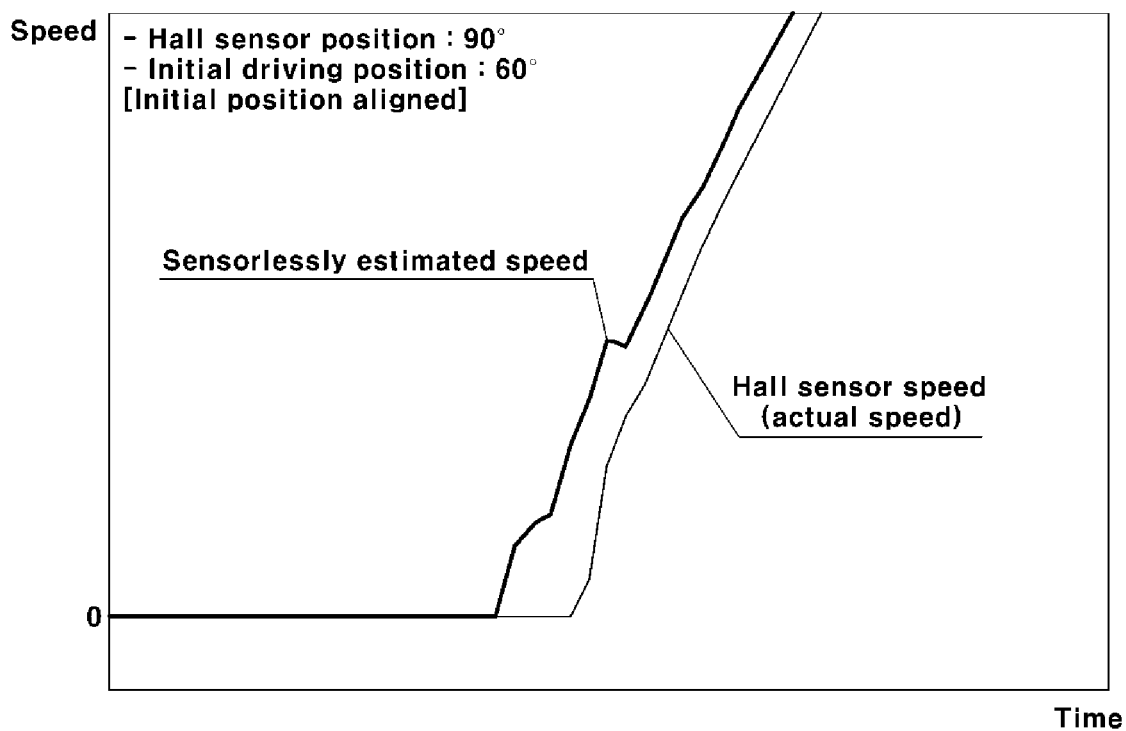
Figure 4D:
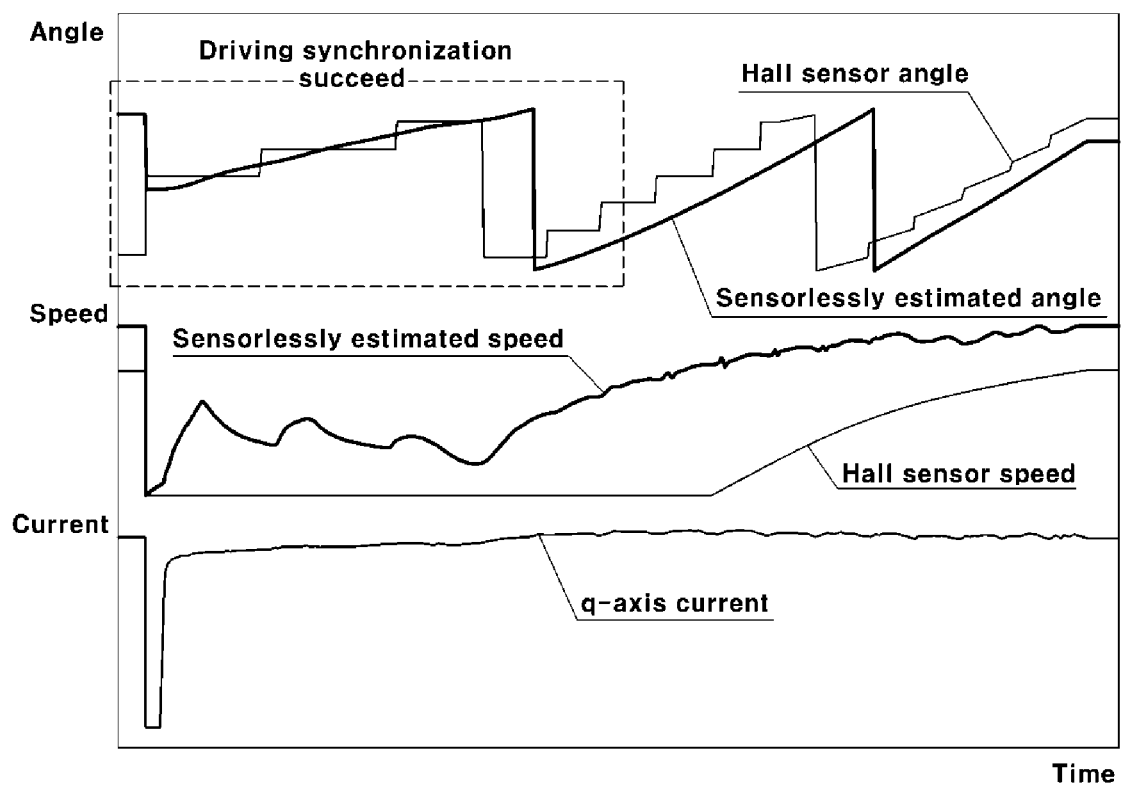

In a case in which the separate Hall sensor is disposed for testing, when speed control is performed by operating the sensorless control logic in a state in which the initial position is known by means of the Hall sensor, it can be appreciated that speed control is directly performed without speed instability, as in examples illustrated in FIGS. 4C and 4D.

In this case, torque is applied by generating a magnetic field from a known physical position of the rotor at an early stage. Thus, the rotor may be synchronized, and thus, the speed control can be performed.

Accordingly, in the sensorless control, the initial position of the rotor can be estimated or is already known.

Method of Comparative Example

As described above, in the related art, a predetermined or higher speed of the motor was obtained by inevitably performing open-loop control so that the position and speed of the motor can be estimated at an early stage of the driving of the motor after being stopped. Here, the open-loop control is a response degrading factor. In order to overcome the problems of the related art, a sensorless control method for driving a method may be considered. In the sensorless control method, the rotor of the motor is moved to and fixed in a predetermined position when the motor is stopped. Afterwards, at a point in time at which the driving of the motor is resumed, the position in which the motor is fixed is used as an initial position.

According to this improved method, the position in which the rotor is fixed during a previous motor stop state is used as the initial position when the driving of the motor is resumed later. Accordingly, as merits, it is possible to promptly start sensorless control, and the open-loop control of the related art is unnecessary.

Hereinafter, the improved method will be described in more detail.

Hereinafter, a method of controlling a sensorless motor for an air compressor may be performed by a control unit or a controller, and all of control processes, which will be described later, may be performed by the control unit.

In addition, the control unit for controlling the sensorless motor may be a typical control unit for controlling a motor of an air compressor in a fuel cell system.

In addition, the sensorless motor is a motor in which a Hall sensor for detecting a position and speed of a rotor is absent.

Since the sensorless motor is provided with no Hall sensor, sensorless control of estimating the position and speed of the motor by a predetermined method and then using the estimated values must be performed to control the driving of the sensorless motor.

In the sensorless motor, an initial position cannot be obtained when the motor is stopped, since there is no Hall sensor. An improved method for overcoming this problem is illustrated in FIG. 5.

Figure 5:
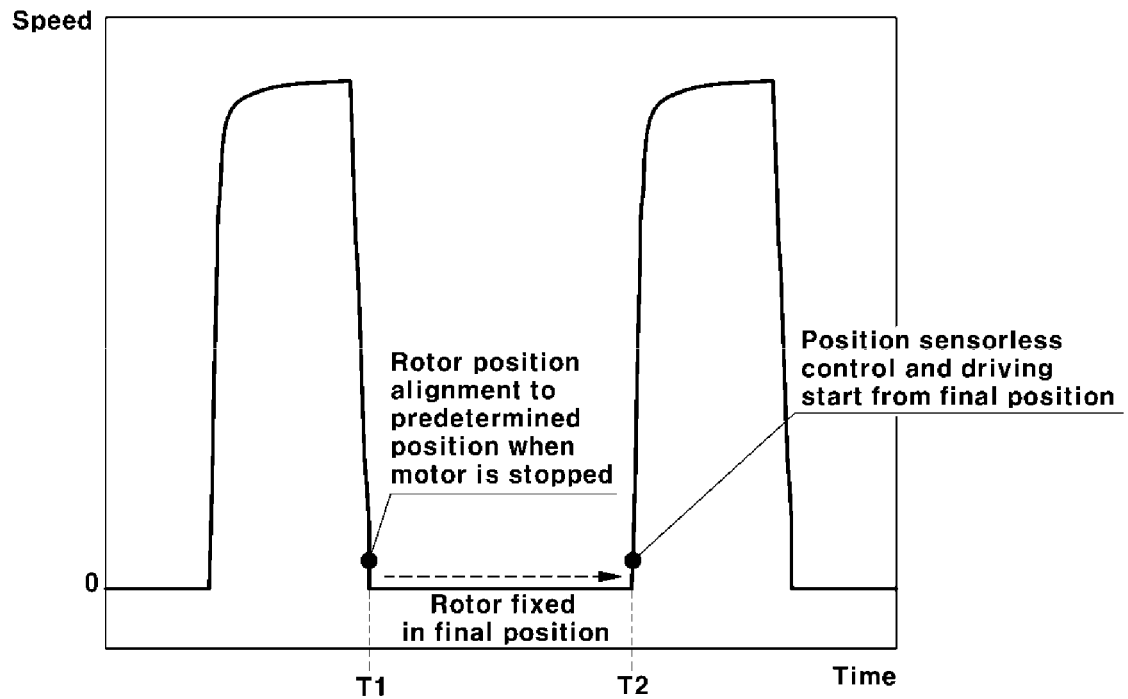
FIG. 5 is a graph illustrating a method according to a comparative example, the method aligning the position of the rotor and performing sensorless control in the aligned position when the motor is stopped.

The improved method for overcoming related-art problem provides a process of aligning the position of the rotor so that the rotor can be at a predetermined angle and position in a process of stopping the motor, as illustrated in FIG. 5.

In addition, when the motor is stopped, the rotor is fixed in a state in which the angle and position thereof are aligned. Afterwards, at an early stage of the driving in which the motor speed control is restarted, the angle and position of the rotor fixed after the alignment are used as an early angle and position, and sensorless control and speed/current control are performed from this position.

Described in more detail with reference to FIG. 5, a point T1 in FIG. 5 is a point in time at which the motor is stopped (hereinafter, referred to as a "motor stop point"), and a point T2 in FIG. 5 is a point in time at which the driving of the motor is resumed and the sensorless control is resumed (hereinafter, referred to as a "restart point").

As illustrated in FIG. 5, rotor position alignment, i.e. a process of controlling the rotor to be fixed in a predetermined position when stopping the motor, is performed.

Consequently, after the motor is stopped, the rotor is position-aligned and is fixed in the predetermined position.

Here, the predetermined position may be the position of the rotor finally estimated by the sensorless control logic at a motor stop determination point, i.e., a point in time at which the control unit determines that the motor is in the stopped state satisfying a predetermined condition, as will be described later.

When the motor is stopped as described above, the rotor is fixed in a final position aligned in a motor stopping process before the driving of the motor is resumed later.

Afterwards, when the driving of the motor is resumed, an initial position of the rotor in which the sensorless control is resumed is a final position of the rotor fixed after being aligned in the motor stopping process, and the sensorless control is started from the final position at a motor restart point, i.e., a point in time at which the driving of the motor is resumed.

That is, motor driving and sensorless control are performed using the final position, i.e., the position of the rotor aligned in the previous motor stopping process, as the initial position.

Figure 6:
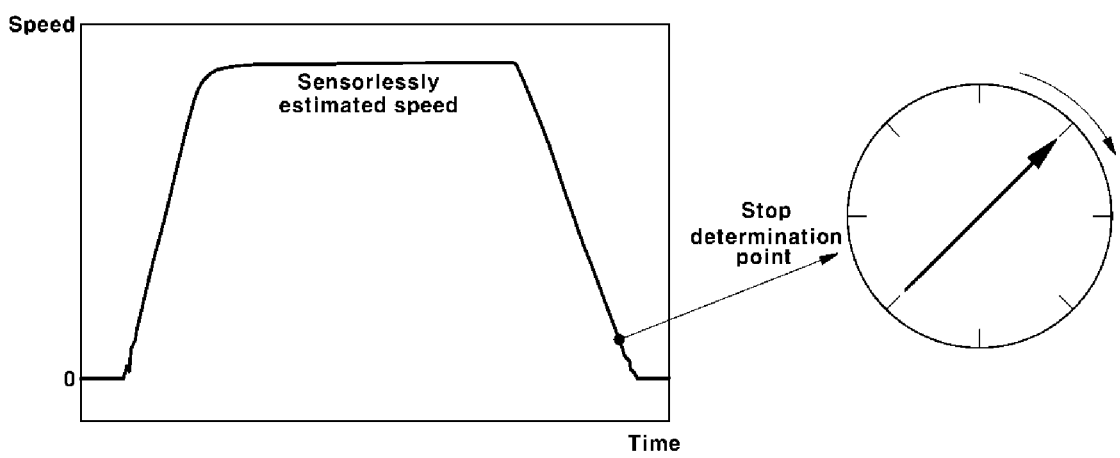
FIG. 6 and FIG. 7A are views illustrating a rotor position alignment method performed for sensorless motor control when the motor is stopped.
Figure 7A:
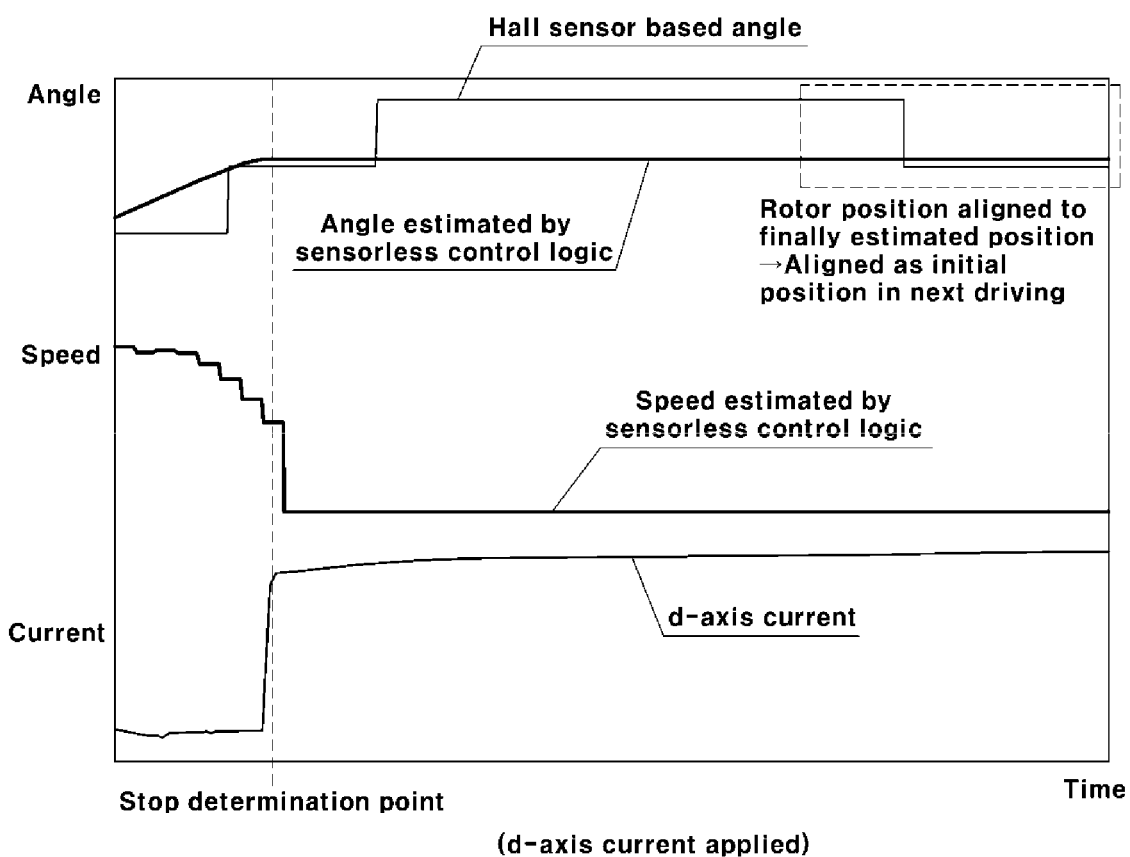

FIG. 6 and FIG. 7A are views illustrating an improved rotor position alignment method according to a comparative example, the method being performed for sensorless motor control when a motor is stopped, and FIG. 7B is a view illustrating a case in which a d-axis current is not applied.

The left part of FIG. 6 illustrates motor speeds in a motor speed control process in which the motor is accelerated after the start of the driving of the motor, is maintained at a constant speed, and then is decelerated to stop.

While the control unit is decelerating the motor to a predetermined speed to stop the motor, if the speed of the motor reaches a predetermined reference speed, the motor is determined to be in a stopped state. The position of the rotor finally estimated by the sensorless control logic at the motor stop determination point is determined to be a fixed position.

Here, the reference speed may be determined to a positive (+) speed greater than 0 rpm.

Subsequently, as illustrated in the right part of FIG. 6, the d-axis current for controlling the position of the rotor to the fixed position is applied to the motor so that the rotor of the motor can be fixed in the position of the rotor finally estimated by the sensorless control logic at the motor stop determination point. In this manner, the rotor is fixed in the fixed position.

Here, the d-axis current for moving and fixing the rotor to the fixed position is applied for a predetermined reference period of time. Due to the application of the d-axis current, the position of the rotor is moved to and fixed in the fixed position.

After the rotor is fixed, the control unit stops all of pulse width modulation (PWM) control processes of generating and outputting a PWM signal, and the motor stop state is maintained until the driving of the motor is resumed.

FIG. 7A illustrates a state in which the rotor is position-aligned, and FIG. 7B illustrates at state in which the rotor is not position-aligned.

A rectangular portion in FIG. 7B, drawn with dotted lines, indicates a state in which the rotor is rotated by inertia.

Since the improved method (method of the comparative example) is applied to the sensorless motor, the motor is not provided with a Hall sensor (position sensor). However, for testing, rotor angles (i.e. Hall sensor based angles) obtained from signals are illustrated in FIGS. 7A and 7B.

In FIGS. 7A and 7B, the "Hall sensor based angles" may be understood as indicating actual positions and angles of the rotor.

Referring to FIG. 7A, a state in which the rotor is position-aligned by applying the d-axis current in a motor stopping process can be appreciated, and it can be appreciated that the d-axis current is applied at a stop determination point before the speed of the motor reaches 0 rpm.

In addition, it can be appreciated that, due to the d-axis current being applied, after the motor is stopped, a position and angle of the rotor are moved to and fixed in a predetermined position, i.e. a position (i.e. a fixed position) finally estimated by the sensorless control logic at the stop determination point.

As illustrated in FIG. 7A, if the control unit generates and outputs the PWM signal and applies the d-axis current instead of directly blocking the PWM signal when the motor is stopped, the position of the rotor can be aligned to be the position (i.e., the fixed position) finally estimated by the sensorless control logic when the motor is stopped, as can be appreciated from information regarding angles of Hall sensor signals (i.e., Hall sensor based angles).

In contrast, referring to FIG. 7B, it can be appreciated that the rotor rotates (see a rectangular portion drawn with dotted lines) when the d-axis current is not applied in the motor stopping process.

That is, as can be apparent from information regarding angles (i.e. Hall sensor based angles) obtained from the Hall sensor signals (i.e., position sensor signals), the position of the rotor is changed as the rotor is rotated by inertia even if no current is applied after the PWM signal is blocked. After the rotation of the rotor is continued, the rotor stops in an unknown position.

As described above, in the motor stopping process, the d-axis current is applied, so that the position and angle of the rotor are aligned to be the position (i.e., fixed position) and angle of the rotor finally estimated at the stopping of the motor by the sensorless control logic. Afterwards, in the stopped state, the position of the rotor is fixed in the aligned position.

Afterwards, when the driving of the motor is started, the sensorless control is directly started without the open-loop control by setting the aligned position of the rotor, i.e. the fixed position, to be an initial position at the motor restart point (i.e., a point T2 in FIG. 5). This can remove a driving delay occurring in the related art and improve the response of motor control and driving.

Figure 8:
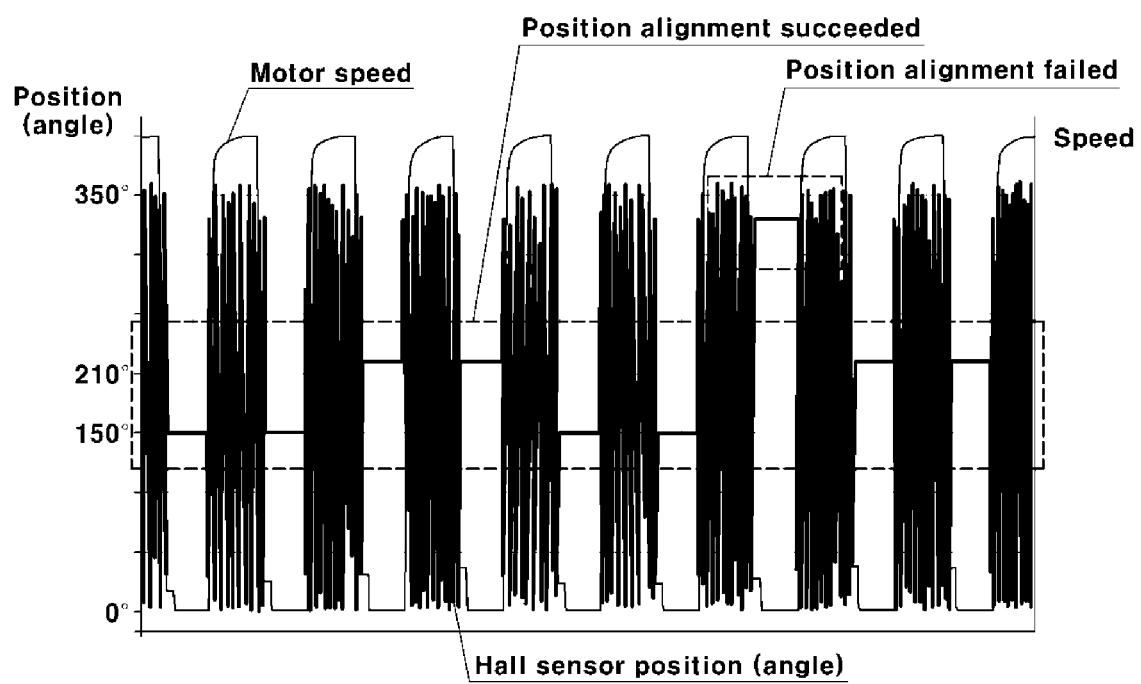
FIG. 8 illustrates rotor positions measured during a motor stop state when the rotor is fixed in a 180° position by applying a d-axis current during the motor stop state.

In addition, motor speeds and rotor positions (i.e., angles) resulting from repeatedly driving and stopping the motor, performed by the improved method of performing initial position alignment in which the position of the rotor during a motor stopped period is fixed in be the position finally determined by the sensorless control logic, are illustrated in FIG. 8.

FIG. 8 illustrates rotor positions measured when the rotor is fixed in a 180° position, i.e., a finally estimated position, by applying a d-axis current during a motor stop state in order to determine whether or not a rotor is actually fixed in an intended position (i.e., angle).

In FIG. 8, the rotor positions (i.e., angles) are measured using a separate Hall sensor. The Hall sensor used is a sensor having 60° resolution. When the rotor is positioned at an angle of 180°, the Hall sensor indicates 150° or 210°.

According to results measured using the Hall sensor illustrated in FIG. 8, it can be appreciated that the position of the rotor is occasionally out of the 180° position to reach the opposite position (alignment failure).

Accordingly, an improved method for removing such alignment failure is required.

Figure 9A:
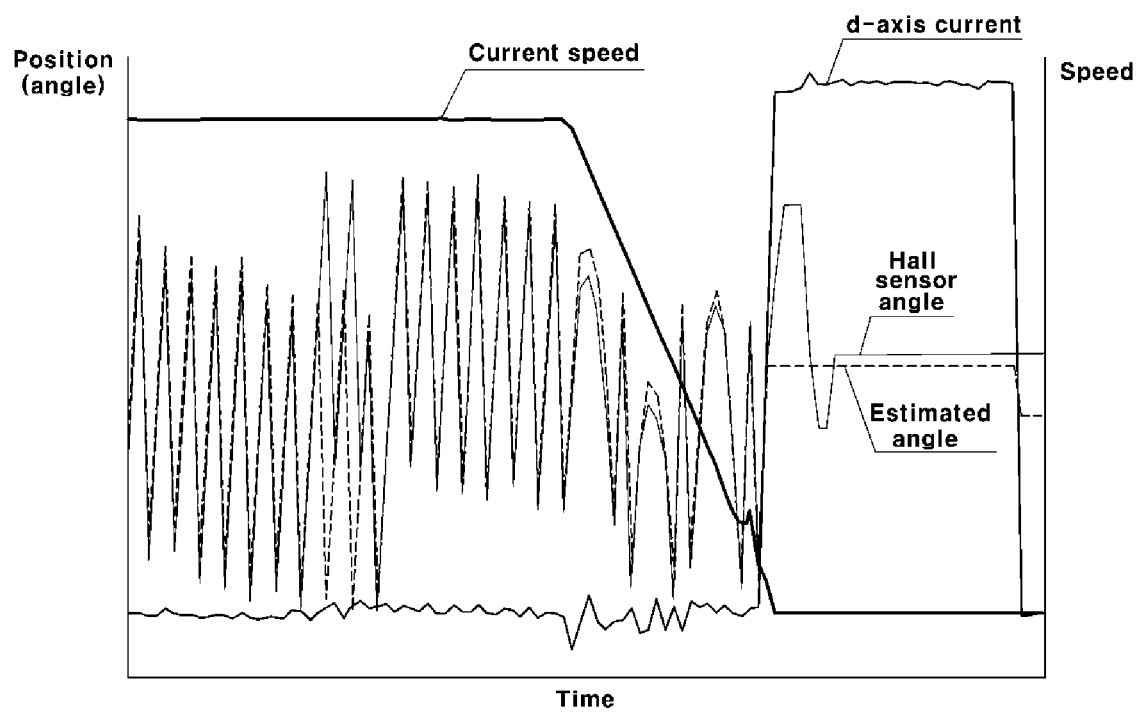
FIGS. 9A and 9B are views analyzing and comparing motor movement examples in which position alignment has succeeded and failed.
Figure 9B:
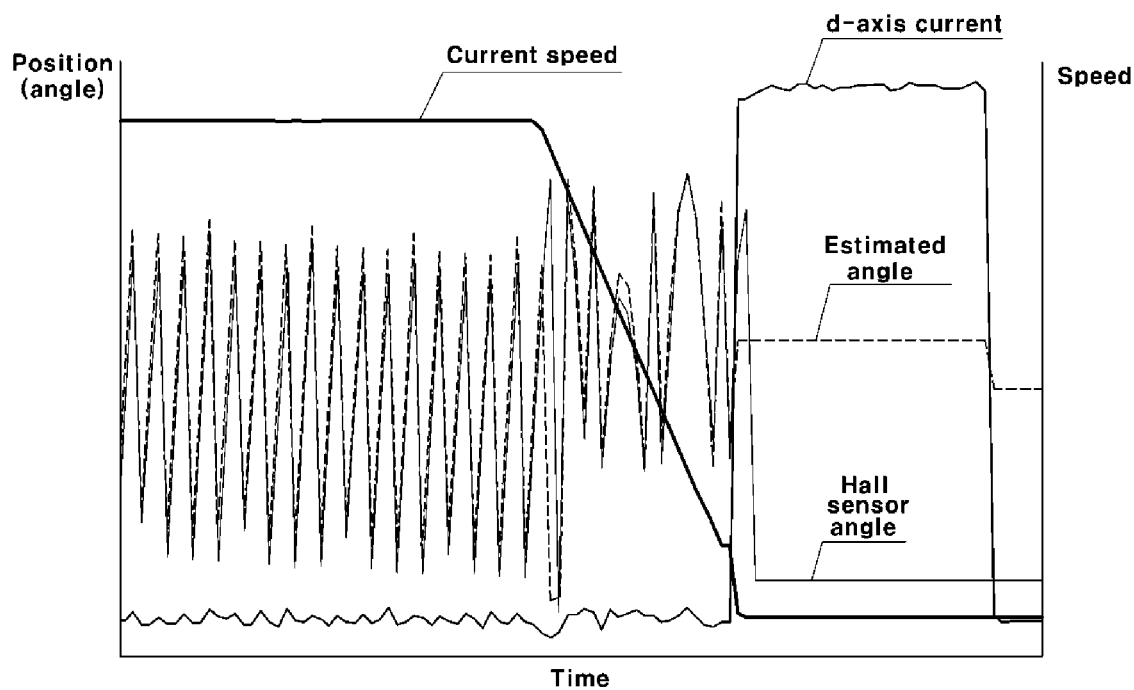

FIGS. 9A and 9B analyze and compare motor movement examples in which position alignment has succeeded and failed. In FIGS. 9A and 9B, FIG. 9A illustrates an example of success in which the rotor is positioned to an alignment target position during a motor stop state, while FIG. 9B illustrates an example of failure in which the rotor is positioned to be misaligned from an alignment target position with a 180° error.

In FIGS. 9A and 9B, "Current speed" indicates motor speeds, and "Estimated angle" indicates an angle finally estimated by the sensorless control logic when a speed of the motor has reached a predetermined reference speed when the motor is stopped.

In addition, in FIGS. 9A an 9B, "Hall sensor angle" indicates angles (or positions) of the rotor measured by adding a separate Hall sensor. Although an actual sensorless motor is not provided with a Hall sensor, the angles of the rotor were measured by adding a Hall sensor for the purpose of comparison.

The Hall sensor angle indicates the actual position of the rotor. The Hall sensor angle approaching the estimated angle means that the rotor is aligned to an intended position.

If the rotor position alignment is successful, a current is fixedly applied to the position of the estimated angle, obtained by the sensorless control logic, thereby generating induced magnetic flux. Consequently, the position of the rotor is fixed in a position consistent with the direction of magnetic flux generated by a permanent magnet of the rotor. As illustrated in FIG. 9A, the actual angle of the rotor (i.e., Hall sensor angle) approaches the estimated angle.

If the rotor position alignment has failed, as illustrated in FIG. 9B, the estimated angle has an error of about 180° from the Hall sensor angle.

This is because, when the position of the rotor is attempted to be fixed at a point in time at which the driving of the motor is stopped, the rotor further rotates due to inertia instead of stopping in the intended position. In this state, if a current is continuously applied to a specific position, the rotor may further rotate by about 180° from the intended position before stopping.

For example, when the rotor is aligned in a direction opposite to magnetic flux induced by a stator, pushing force and pulling force may be balanced, thereby fixing the rotor in the opposite position so as not to rotate in any direction.

Exemplary Embodiments

Accordingly, the present disclosure is intended to provide an improved method able to overcome problems occurring in a related-art sensorless control method in which open-loop control is performed at an early stage of driving when the driving of a motor is resumed after being stopped and occurring in a sensorless control method in which the position of a rotor of the motor is fixed and aligned in accordance with a finally estimated position value finally estimated by a sensorless control logic when the motor is stopped.

In particular, according to the present disclosure, also provided is a method of controlling a sensorless motor for an air compressor, the method being able to overcome a rotor alignment failure problem in that a rotor is not aligned to an intended position by the rotor position alignment performed in accordance with the finally estimated position value when the motor is stopped.

According to the present disclosure, rotor position alignment is performed to control the rotor to be fixed in an alignment target position when the motor is stopped. This rotor position alignment is substantially the same as in the methods described above with reference to FIGS. 5, 6, and 7A.

Here, the alignment position as intended (hereinafter, referred to as the "alignment target position") may be a position of the rotor finally estimated by the sensorless control logic at a point in time at which a control unit or a controller determines that the motor is in the stopped state satisfying a predetermined condition (or motor stop determination point).

In addition, after the motor has stopped, the rotor is fixed in the position aligned during the motor stopping process (i.e., the alignment target position) before the driving of the motor is resumed later.

Afterwards, when the driving of the motor is resumed, an initial position of the rotor at a restart point of sensorless control is the final rotor position (i.e., the alignment target position) that has been fixed after being aligned in the motor stopping process. Sensorless control is started from the final position at the motor restart point at which the driving is resumed.

That is, the following motor driving and sensorless control are performed using the final position, i.e. the position of the rotor aligned during the previous motor stopping process, as the initial position.

The left part of FIG. 6 illustrates motor speeds during the motor speed control process in which the motor is accelerated after the start of the driving of the motor, is maintained at a constant speed, and then is decelerated so as to be in the stopped state.

While the control unit is decelerating the motor to a predetermined speed to stop the motor, if the speed of the motor reaches a predetermined reference speed, the motor is determined to be in a stopped state. The position of the rotor finally estimated by the sensorless control logic at a motor stop determination point, i.e. a point in time at which the motor is determined to be in the stopped state, is determined to be the alignment target position (or a fixed position).

Here, the reference speed may be determined to a positive (+) speed greater than 0 rpm.

Subsequently, as illustrated in the right part of FIG. 6, a d-axis current for controlling the position of the rotor to the alignment target position is applied to the motor so that the rotor of the motor can be fixed in the alignment target position, i.e. the position of the rotor finally estimated when the motor is determined to be in the stopped state. In this manner, the rotor is rotated to and fixed in the alignment target position.

Here, the d-axis current for moving (rotating) and fixing the rotor to the alignment target position is applied for a predetermined reference period of time. Due to the application of the d-axis current, the position of the rotor is moved to and fixed in the alignment target position.

After the rotor is fixed, the control unit stops all of PWM control processes of generating and outputting a PWM signal, and the motor stop state is maintained until the driving of the motor is resumed.

In addition, according to the present disclosure, after an alignment start position for rotor position alignment is determined, when the rotor is positioned in the alignment start position determined, the d-axis current for position alignment is applied to the motor.

That is, a novel concept of the alignment start position is introduced and used.

Figure 10:
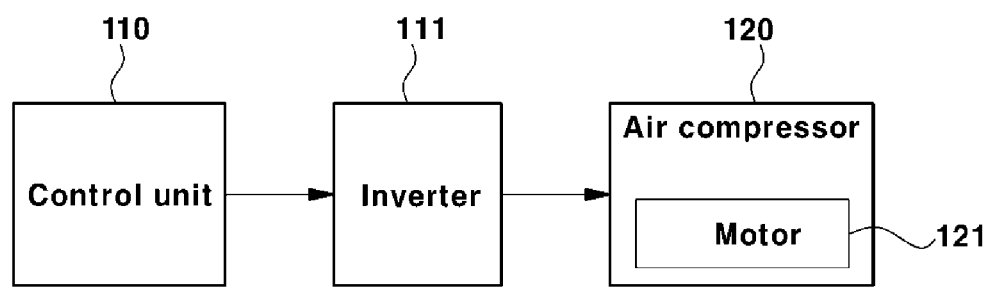
FIG. 10 is a block diagram schematically illustrating the configuration of a system for controlling a sensorless motor according to the present disclosure.
Figure 11:
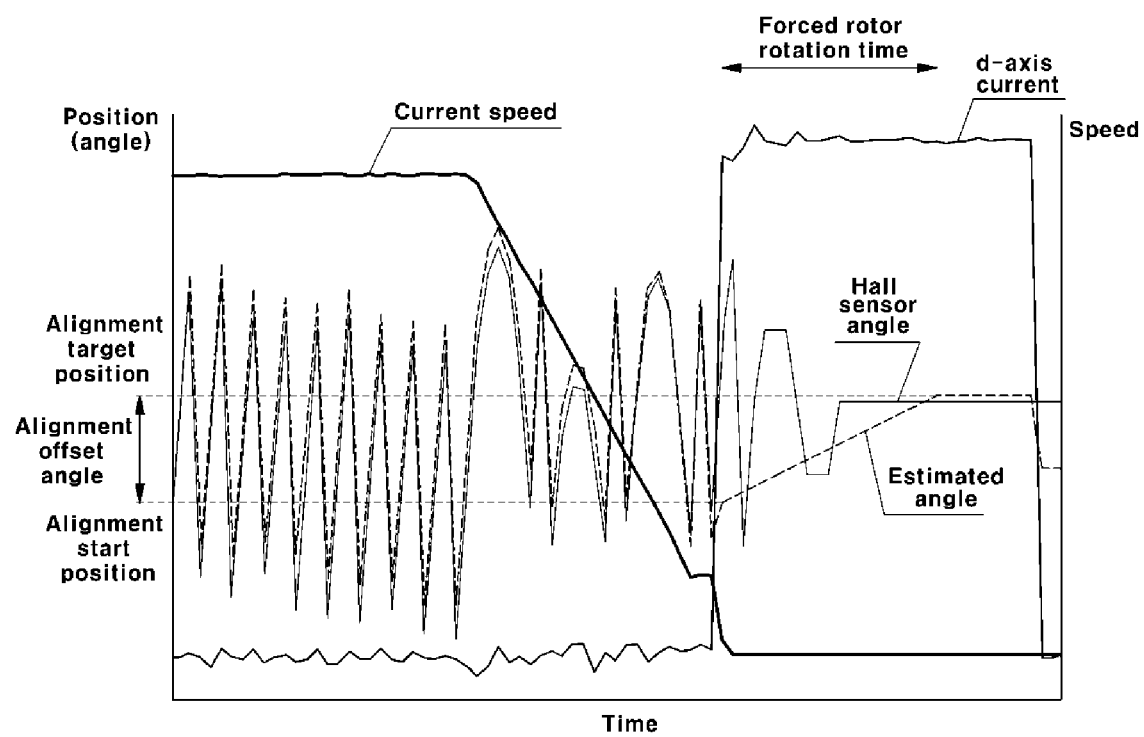
FIG. 11 is a graph illustrating a method of aligning the position of a rotor when a motor is stopped in a process of controlling a sensorless motor according to the present disclosure.

FIG. 10 is a block diagram schematically illustrating the configuration of a system for controlling a sensorless motor according to the present disclosure, and FIG. 11 is a graph illustrating a method of aligning the position of a rotor when a motor is stopped in a process of controlling a sensorless motor according to the present disclosure.

Figure 12:
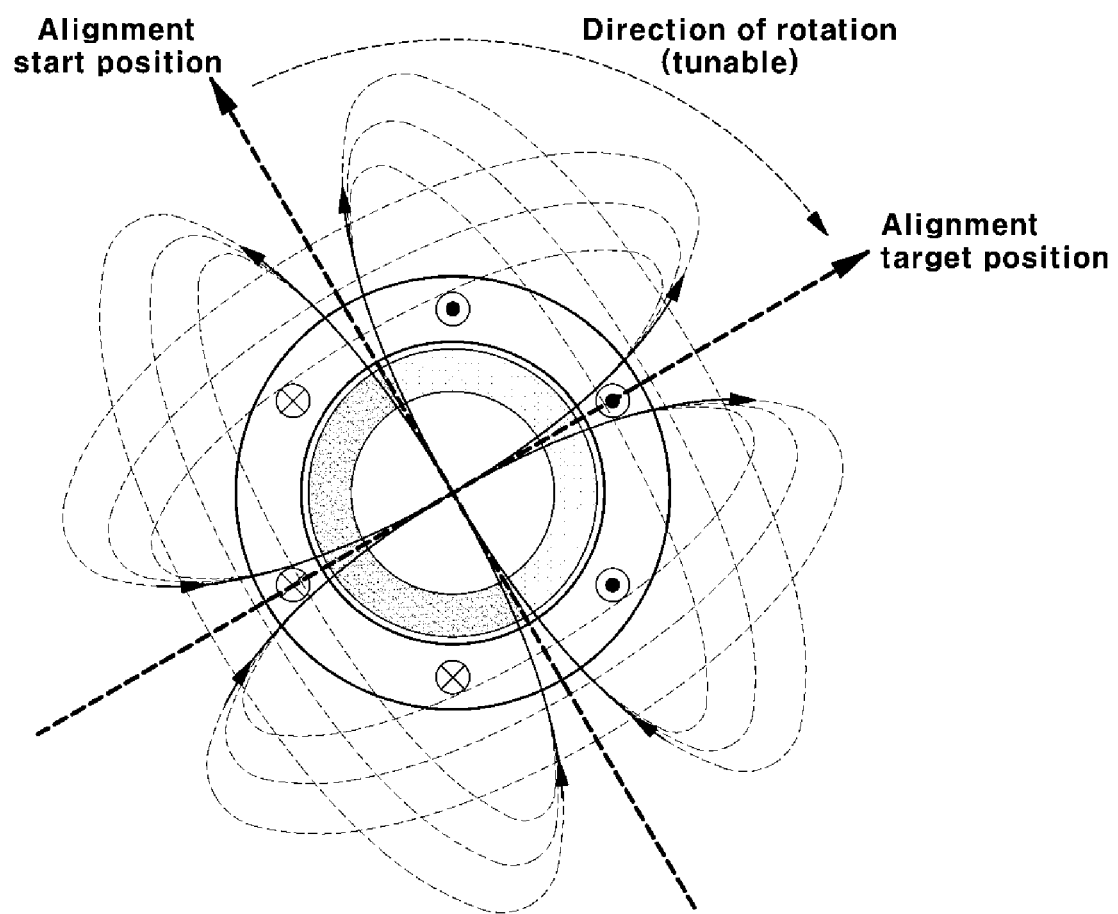
FIG. 12 is a view illustrating the method of aligning the position of a rotor according to the present disclosure, in which current application states of the rotor, a stator, and stator coils, as well as magnetic flux induced to the stator, are represented.

In addition, FIG. 12 is a view illustrating the method of aligning the position of a rotor according to the present disclosure. In FIG. 12, current application states of the rotor, a stator, and stator coils, as well as magnetic flux induced to the stator, are illustrated.

In the drawings, the position and angle indicate the rotational position and the rotational angle of the rotor in a motor 121.

According to the present disclosure, more specifically describing the process of aligning the position of the rotor when the motor 121 is stopped, if the speed of the motor is decelerated to a predetermined reference speed so that the motor stops, a control unit 110 determines that the motor is in a stopped state, and determines a finally estimated position value, i.e. a position of the rotor finally estimated by the sensorless control logic at a motor stop determination point, to be an alignment target position.

Subsequently, the control unit 110 determines the alignment start position by subtracting a predetermined alignment offset value from the alignment target position (i.e. angle) in a direction opposite to the direction of rotation of the rotor, and starts a control process for rotor position alignment from the alignment start position.

That is, the control unit 110 controls an inverter 111 to apply a d-axis current to a motor 121 of an air compressor 120 to enable the rotor position alignment from the alignment start position.

In addition, the control unit 110 controls the position of the rotor to linearly change during a predetermined period of time until the position of the rotor reaches the alignment target position from the alignment start position determined as above.

Here, the control unit 110 controls the phases of phase currents (U, V, and W phases), applied when the d-axis current is applied, so that the position of the rotor can linearly change from the alignment start position to the alignment target position.

According to the present disclosure, changing the position of the rotor means further rotating the rotor, and linearly changing the position of the rotor means changing the position of the rotor from the alignment start position to the alignment target position at a predetermined rate of change (or gradient).

In addition, according to the present disclosure, an alignment offset angle, i.e., an angle between the alignment start position and the alignment target position, is an angle that can be tuned and changed to an optimum angle, and a rotor rotation time from the alignment start position to the alignment target position is a time that can be previously tuned and changed for use.

As described above, according to the present disclosure, if the alignment target position and the alignment start position are determined by the control unit 110, the control unit 110 starts to apply the d-axis current to the motor 121 when the rotor is in the alignment start position. Afterwards, the d-axis current is continuously applied until the rotor reaches the alignment target position.

Here, the control unit 110 controls the phase of the current so that the position of the rotor linearly changes at the predetermined rate of change (or a gradient of angle) until the position of the rotor changes from the alignment start position to the alignment target position.

During the motor stopping process as described above, the position of the rotor is continuously changed by induced magnetic flux generated by a current applied to the stator coils, so that the rotor position alignment is performed.

In addition, while the rotor position is continuously changed, the rotational inertia of the rotor is continuously reduced. When the induced magnetic flux reaches the alignment target position, the rotational inertia of the rotor is smaller than braking force caused by the induced magnetic flux, thereby fixing the rotor to an intended position.

In the method described above with reference to FIGS. 5, 6, and 7A, if the speed of the motor estimated by the sensorless control logic reaches the reference speed at a specific point in time, a d-axis current for moving (rotating) the rotor to the alignment target position is applied at this point in time. Here, from the point in time at which the speed of the motor reaches the reference speed, the d-axis current for controlling the position of the rotor to be a fixed position (i.e. the alignment target positions) is applied without current phase control.

Accordingly, in the above-described method, the rotational inertia of the rotor is occasionally greater than braking force caused by the induced magnetic flux, so that the rotor further rotates halfway. Consequently, although not intended, the rotor is positioned in a direction opposite to the induced magnetic flux. Accordingly, the rotor is aligned to a position in which pushing force and pulling force are balanced, and thus, is stopped in that position, which is problematic.

In contrast, according to the present disclosure, current control of continuously changing the position of the rotor from the alignment start position to the alignment target position, i.e. current phase control of forcibly rotating the rotor so as to linearly change the position for a predetermined period of time, is performed.

Here, even when the rotor is continuously forcibly rotated from the alignment start position to the alignment target position to be in a position opposite to the induced magnetic flux, the position of the induced magnetic flux continuously moves, so that the rotor can continuously move instead of being stopped in a direction in which pushing force and pulling force are balanced. Consequently, the rotor can be accurately fixed in the alignment target position.

Figure 13:
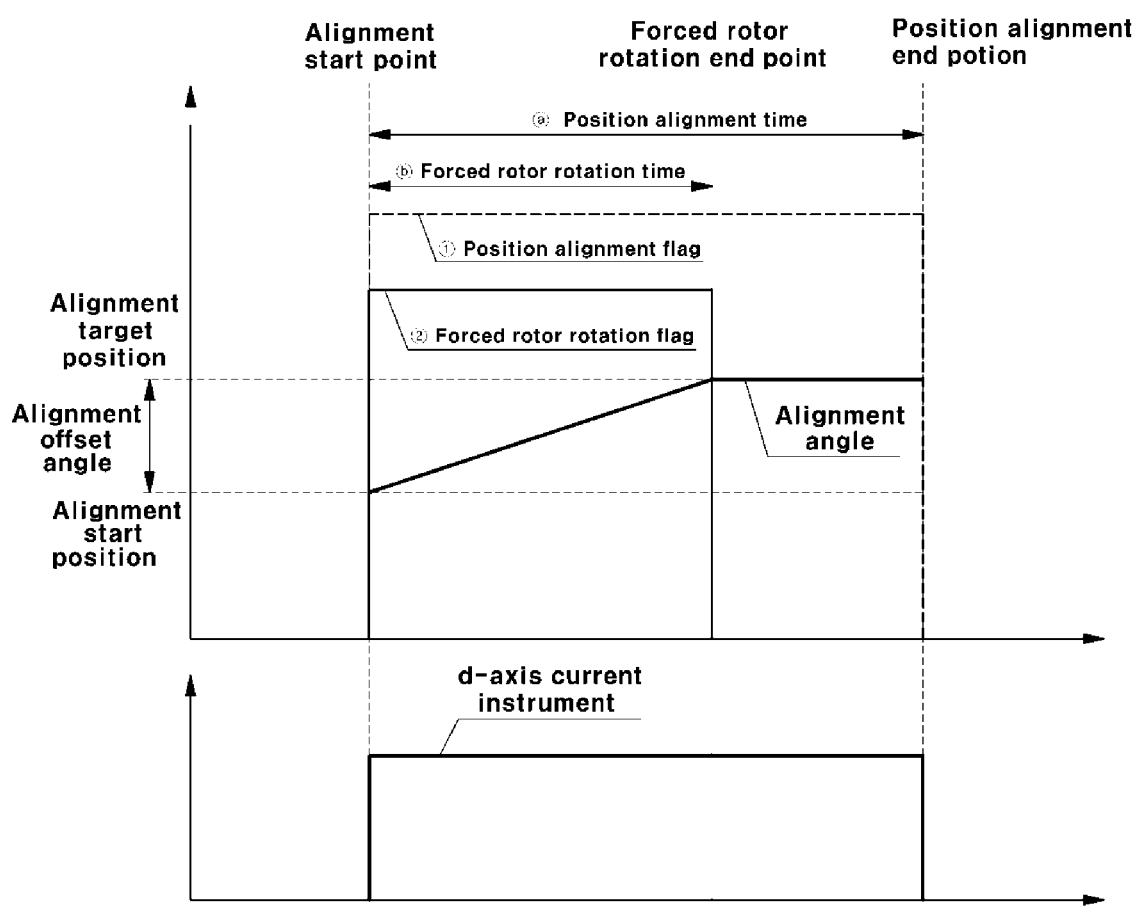
FIG. 13 is a graph illustrating a control method for rotor position alignment according to the present disclosure, the control method being performed when the motor is stopped.

FIG. 13 is a graph illustrating a control method for rotor position alignment according to the present disclosure, the control method being performed when the motor is stopped. As illustrated in FIG. 13, a position alignment flag ① is defined to determine whether or not to perform the rotor position alignment.

In addition, as illustrated in FIG. 13, a forced rotor rotation flag ② is defined to determine whether or not to forcibly rotate the rotor for the position alignment.

Periods of time in which ① and ② are maintained are predetermined by the control unit 110. Such a period of time can be tuned depending on the system.

A period of time ⓐ in FIG. 13, in which the flag ① is maintained, is a position alignment time that is set such that position alignment is performed in the position alignment time.

In addition, a period of time ⓑ in FIG. 13, in which the flag ② is maintained, is a forced rotor rotation time, i.e. a period of time in which the rotor is forcibly rotated. The period of time ⓑ is set such that the position of the rotor is linearly and continuously changed from the alignment start position to the alignment target position.

As illustrated in FIG. 13, while the position alignment flag ① is being TRUE, the control unit 110 continuously generates and outputs a d-axis current instruction during the position alignment time ⓐ, so that the inverter 111 can continuously apply a constant d-axis current to the motor 121 of the air compressor 120.

In addition, while the forced rotor rotation flag ② is being TRUE, the control unit 110 continuously and forcibly rotates the rotor from the alignment start position to the alignment target position during the forced rotor rotation time ⓑ, thereby linearly increasing the angle indicating the position of the rotor as illustrated in FIG. 13.

In addition, if the forced rotor rotation flag ② is set to be FALSE, the position (or angle) of the rotor is maintained to be constant while the position alignment flag ① is being TRUE.

Referring to FIG. 13, it can be appreciated that the position alignment time ⓐ defines a position alignment end point. After the position alignment time ⓐ, the position alignment flag ① is changed to FALSE, so that the rotor position alignment is completed at the end point.

Figure 14A:
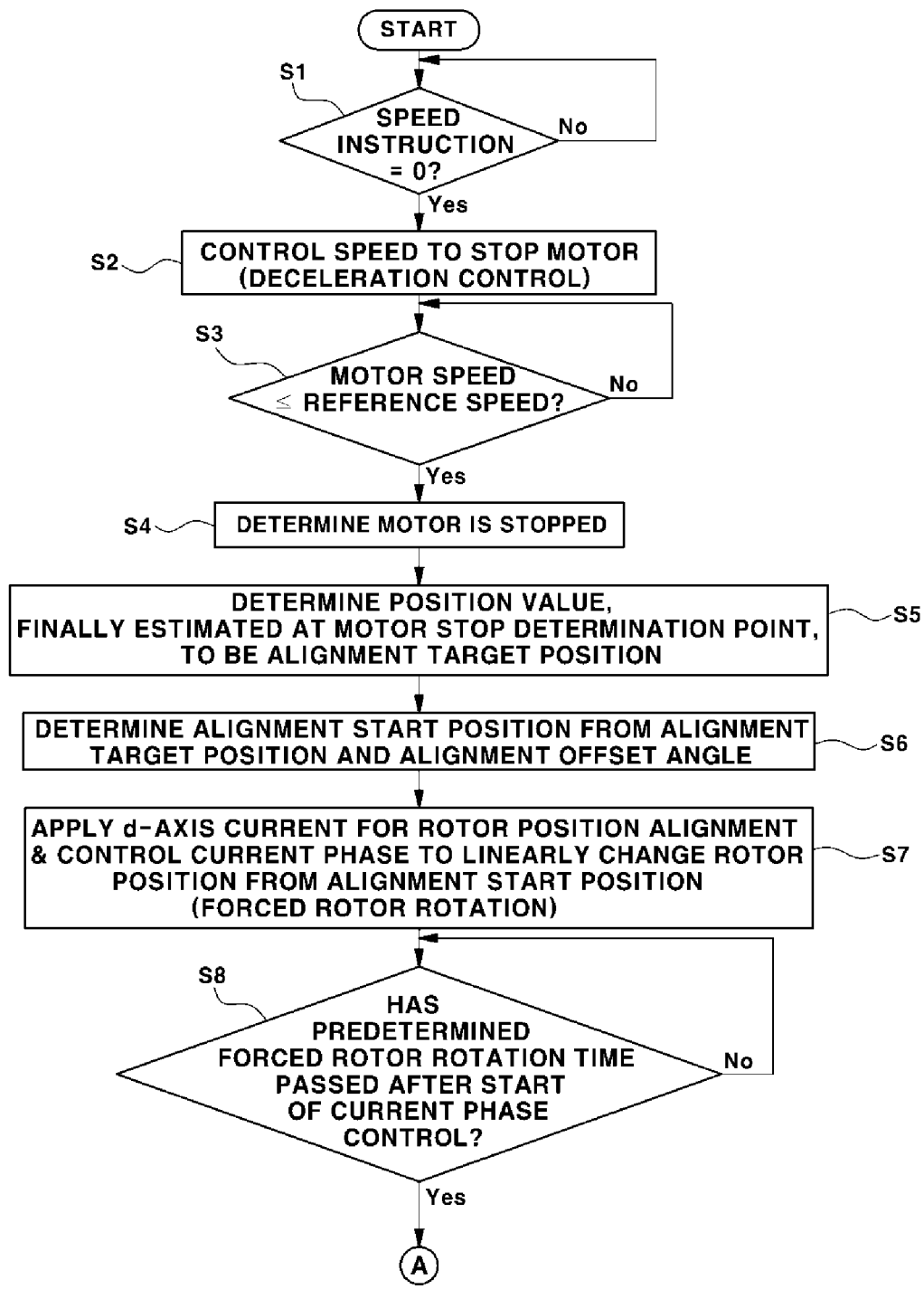
FIGS. 14A and 14B are a flowchart illustrating an overall process of controlling a sensorless motor according to the present disclosure.
Figure 14B:
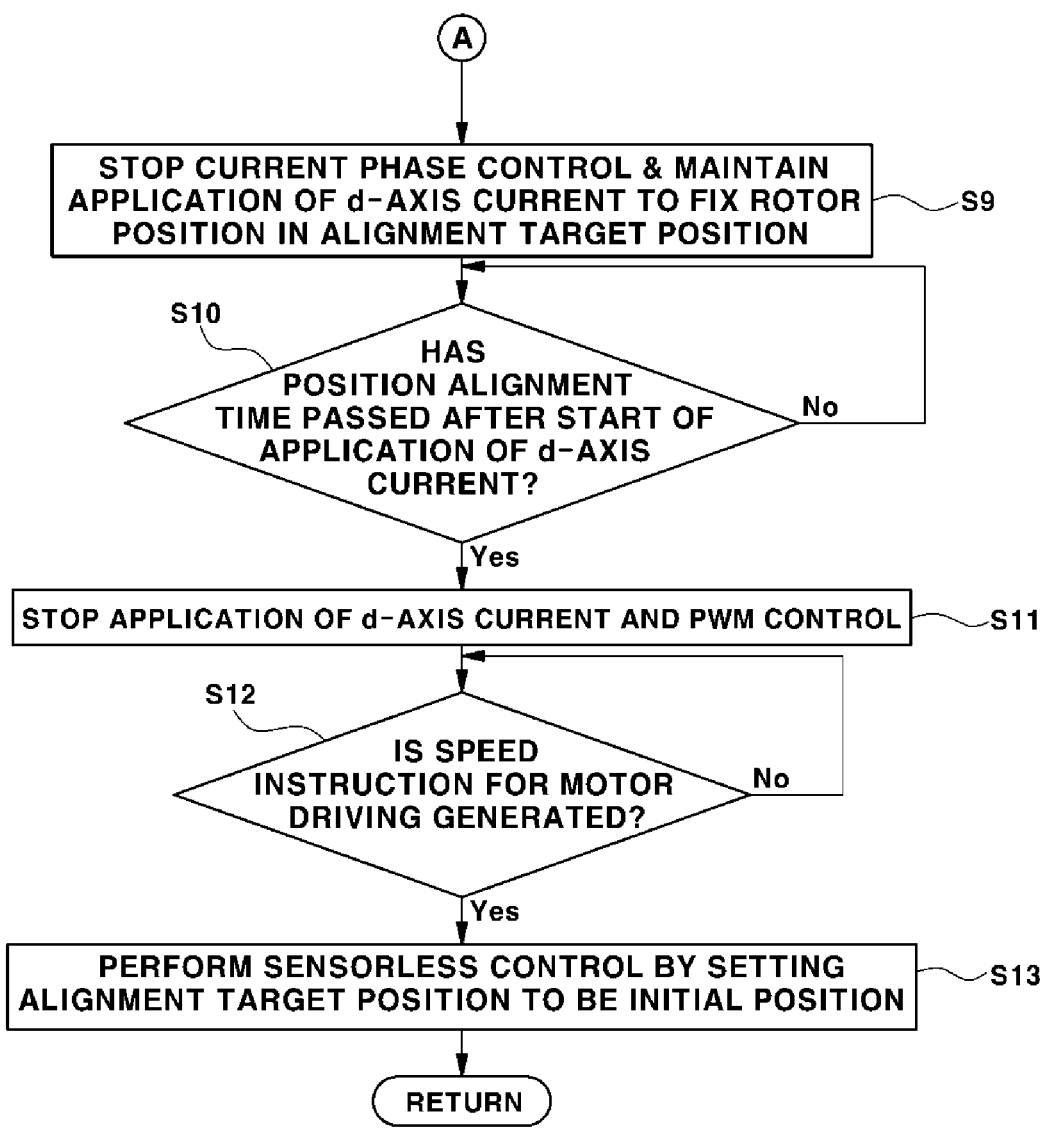
Figure 15:
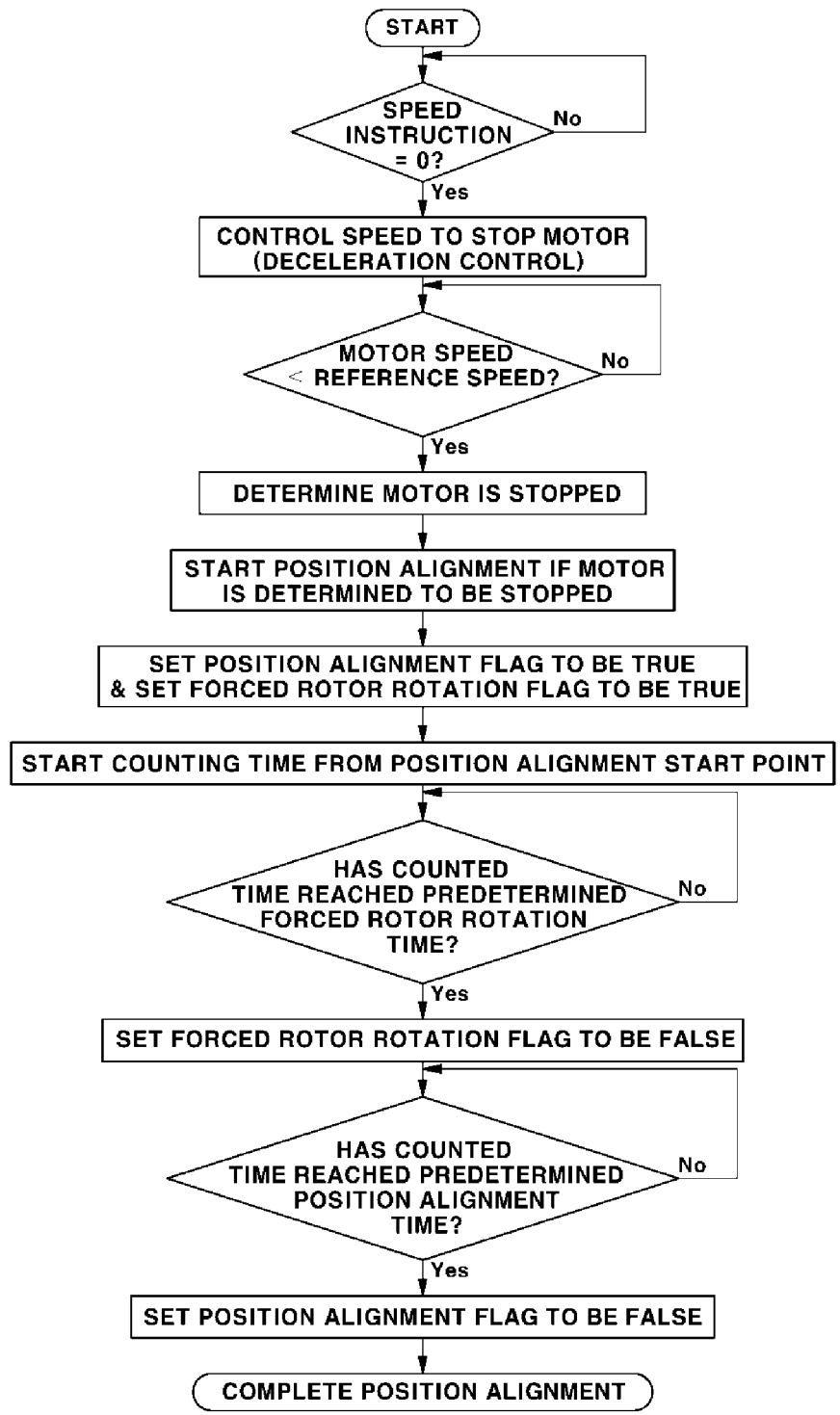
FIG. 15 is a flowchart more specifically illustrating processes of setting the position alignment flag and the forced rotor rotation flag in the control unit in the process of controlling a sensorless motor according to the present disclosure.

FIGS. 14A and 14B are a flowchart illustrating an overall process of controlling a sensorless motor according to the present disclosure, and FIG. 15 is a flowchart more specifically illustrating processes of setting the position alignment flag and the forced rotor rotation flag in the control unit 110 in the process of controlling a sensorless motor according to the present disclosure.

With reference to FIGS. 14A, 14B and 15, after the motor 121 of the air compressor 120 is driven, the control unit 110 determines whether or not a motor speed instruction is set to be a motor stopping instruction value, e.g. an instruction value 0 rpm, in S1.

Here, if the motor speed instruction is set to be the instruction value 0 rpm, the control unit 110 reduces the speed of the motor by performing typical sensorless deceleration control to stop the motor in S2.

Afterwards, the speed of the motor estimated by the control unit 110 using the sensorless control logic is compared with a predetermined reference speed rpm in S3. If the speed of the motor reaches and is slower than the reference speed, the motor is determined to be in a stopped state in S4.

If the motor 121 of the air compressor 120 is determined to be in the stopped state as described above, the control unit 110 starts position alignment, as illustrated in FIG. 15, to set a position alignment flag ① (see FIG. 13) to be TRUE and, at the same time, a forced rotor rotation flag ② (see FIG. 13) to be TRUE.

Afterwards, if the motor is determined to be in the stopped position, the control unit 110 sets the position alignment flag and the forced rotor rotation flag to be TRUE, and then, starts counting time, as illustrated in FIG. 15.

Afterwards, the control unit 110 maintains the forced rotor rotation flag ② to be TRUE until the time counted from a point in time at which the position alignment is started reaches the forced rotor rotation time ⓑ (see FIG. 13).

If the time counted reaches the forced rotor rotation time, the forced motor rotation flag ② in the control unit 110 is set to be FALSE.

In addition, the control unit 110 maintains the position alignment flag ① (see FIG. 13) to be TRUE until the time counted reaches the position alignment time ⓐ (see FIG. 13), even when the forced rotor rotation flag ② is set to be FALSE after the forced rotor rotation time ⓑ.

However, as illustrated in FIG. 15, in a case in which the forced rotor rotation flag ② is set to be FALSE after the forced rotor rotation time ⓑ, if the time counted reaches the position alignment time, the position alignment flag ① in the control unit 110 is set to be FALSE.

Returning to FIG. 14A, if the speed of the motor reaches the referenced speed and the motor is determined to be in the stopped state, the control unit 110 determines a finally estimated position value, i.e. a position of the rotor finally estimated by the sensorless control logic at the motor stop determination point, to be an alignment target position in S5.

In addition, if the alignment target position is determined, the control unit 110 determines the alignment start position by subtracting an alignment offset angle, determined in a direction opposite to the direction of rotation of the rotor, from the alignment target position in S6.

Afterwards, if both the position alignment flag ① and the forced rotor rotation flag ② are simultaneously set to be TRUE, the control unit 110 starts to control the inverter 111 to apply a d-axis current for the rotor position alignment to the motor 121 of the air compressor 120 in order to move the position of the rotor to the alignment target position, in S7.

Afterwards, while the position alignment flag ① is being TRUE (i.e. during the predetermined position alignment time ⓐ), the control unit 110 continuously applies the d-axis current (i.e. generates and outputs a PWM signal) to the motor 121. When the position alignment flag ① is changed to FALSE (i.e. at the position alignment end point in FIG. 13) after the passage of the position alignment time ⓐ from the motor stop determination point, the control unit 110 stops the application of the d-axis current.

In addition, if both the position alignment flag ① and the forced rotor rotation flag ② are simultaneously set to be TRUE and the d-axis current is applied, the control unit 110 performs current phase control to linearly change the position of the rotor from the alignment start position to the alignment target position while the forced rotor rotation flag ② is being TRUE.

That is, during the forced rotor rotation time ⓑ determined from the motor stop determination point, the phases of phase currents, such as U, V, and W phases, applied to the motor 121 via the inverter 111, are controlled so that the position of the rotor can linearly change (i.e. the angle of alignment of the rotor continuously and linearly changes in FIG. 13).

Thus, during the forced rotor rotation time ⓑ in which the forced rotor rotation flag ② is maintained to be TRUE, the rotor is forcibly rotated from the alignment start position to the alignment target position in S7. During the forced rotation, the position of the rotor changes at a predetermined rate of change (e.g., a predetermined gradient of angle in FIG. 13) before reaching the alignment target position.

Here, a rate of change in the position of the rotor from the alignment start position to the alignment target position may be defined by Formula 1:

Rate of change in position of rotor=(Alignment offset angle)/(Forced rotor rotation time)  (Formula 1)

In Formula 1, the alignment offset angle and the forced rotor rotation time are values previously known to the control unit 110. Thus, the rate of change in the position of the rotor defined by Formula 1 may be a value that is already known to the control unit 110 or that can be calculated by the control unit 110.

In addition, since the position of the rotor changes at the rate of change from the alignment start position to the alignment target position, in a period of time from a forced rotor rotation start point (i.e. a point in time at which both flags are set to be TRUE) serving as a motor stop determination point to a forced rotor rotation end point (i.e. a point in time at which the forced rotor rotation flag is converted to FALSE), the position of the rotor may be estimated on the basis of the alignment start position and the rate of change in the position of the rotor.

That is, the position of the rotor between the alignment start position and the alignment target position may be estimated by Formula 2.

Estimated position=Alignment start position+(Rate of change×Time counted)  (Formula 2)

Here, the "Estimated position" is an estimated value of the position of the rotor changing from the alignment start position to the alignment target position, and the "Rate of change" is the rate of change in the position of the rotor defined by Formula 1 above.

In addition, the "Time counted" means a period of time counted from a point in time at which the two flags, i.e. both the position alignment flag ① and the forced rotor rotation flag ②, are set to be TRUE, since the motor is determined to be in the stopped state by the control unit 110.

In the present disclosure, the position of the rotor estimated by Formula 2 may be used by the control unit 110 to control the position of the rotor.

Figure 16:
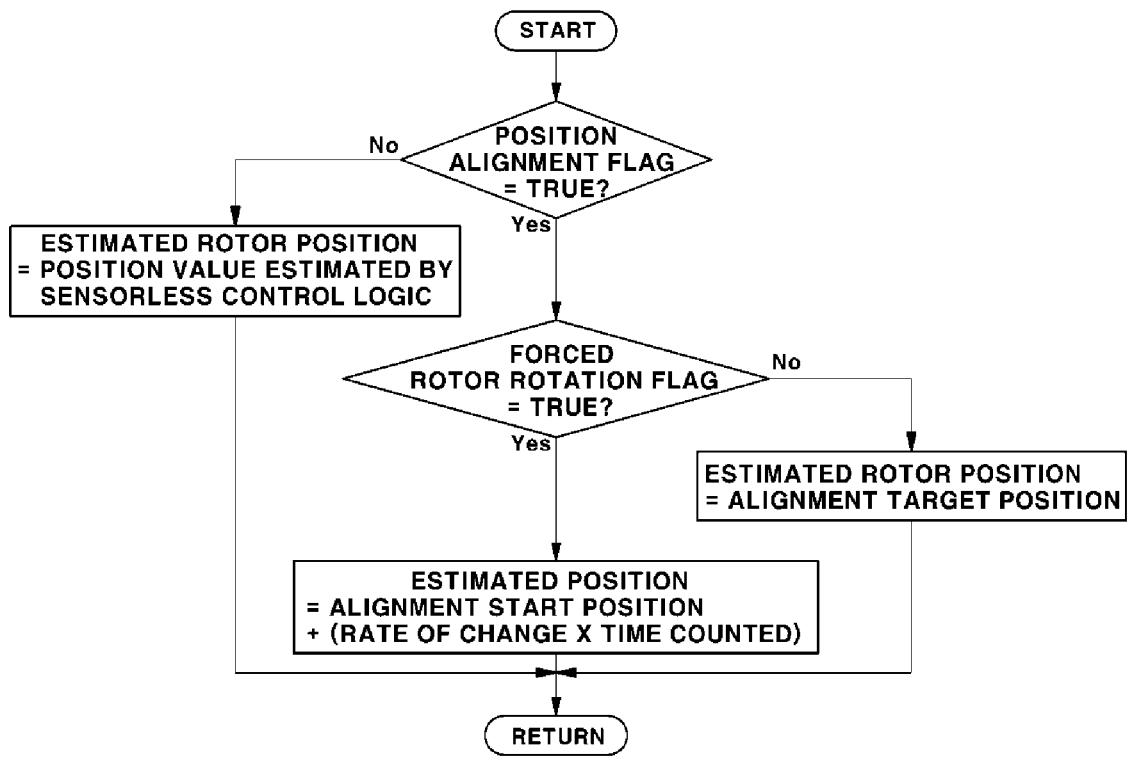
FIG. 16 is a flowchart illustrating a process of estimating the position of the rotor in the motor stopping process according to the present disclosure.

FIG. 16 is a flowchart illustrating a process of estimating the position of the rotor in the motor stopping process according to the present disclosure. As illustrated in FIG. 16, neither the position alignment flag ① nor the forced rotor rotation flag ② is TRUE until the driving of the motor 121 is stopped. Here, the estimated position of the rotor is an estimated position value obtained by the sensorless control logic.

In addition, if the motor 121 is stopped and both the position alignment flag ① and the forced rotor rotation flag ② are simultaneously set to be TRUE, the control unit 110 controls the phase of current applied to the motor 121 of the air compressor 120 via the inverter 111, so that the rotor is forcibly rotated from the alignment start position to the alignment target position. Here, the phase of the current is controlled so that the position of the rotor is linearly changed at a predetermined rate of change.

Thus, if both the flags are TRUE, as illustrated in FIG. 16, the position of the rotor is estimated as a value of "Alignment start position+(Rate of change×Time counted)", as represented by Formula 2.

However, if the time counted from the motor stop determination point reaches the forced rotor rotation time and the forced rotor rotation flag ② is converted to FALSE, the estimated position of the rotor is the alignment target position when the position alignment flag ① is TRUE.

Afterwards, returning to FIG. 14A after the start of the current phase control for the forced rotor rotation, the control unit 110 determines whether or not the time counted from the motor stop determination point has reached the predetermined forced rotor rotation time in S8. If the counted time has reached the forced rotor rotation time, the control unit 110 stops the current phase control for linearly changing the position of the rotor but continues the application of the d-axis current for fixing and maintaining the position of the rotor in the alignment target position in S9 (See FIG. 14B).

Here, the forced rotor rotation flag ② in the control unit 110 is set to be FALSE, and the position alignment flag ① is maintained to be TRUE.

Afterwards, the control unit 110 determines whether or not the time counted after the start of the motor stop determination and the application of the d-axis current has reached the position alignment time in S10. If the counted time has reached the position alignment time, the control unit 110 stops the application of the d-axis current and the PWM control, thereby completing the rotor position alignment in S11.

Afterwards, if a speed instruction for the driving of the motor is generated and the driving of the motor is resumed in S12, the control unit 110 starts sensorless control over the motor 121 by setting the alignment target position to be an initial position in S13.

Figure 17:
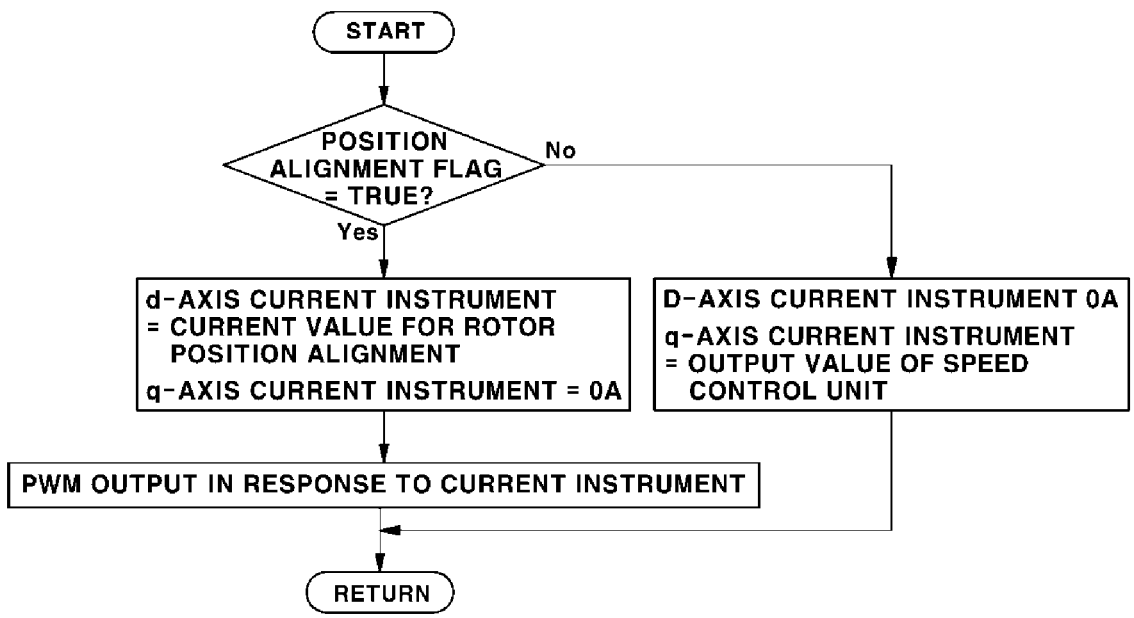
FIG. 17 is a flowchart illustrating a process of determining a d-axis current instruction and a q-axis current instruction in accordance with the position alignment flag in the control unit according to the present disclosure.

FIG. 17 is a flowchart illustrating a process of determining a d-axis current instruction and a q-axis current instruction in accordance with the position alignment flag in the control unit according to the present disclosure. If the position alignment flag ① in the control unit 110 is TRUE, the d-axis current instruction is generated. As the control unit 110 performs the PWM output in accordance with the current instruction, the d-axis current may be applied to the motor 121.

As set forth above, the method of controlling a sensorless motor for an air compressor according to the present disclosure can improve speed control response at an early stage of the driving of the air compressor, thereby improving air supply response, stack output response, and vehicle acceleration performance of a fuel cell stack.

In addition, it is possible to obtain speed control reliability at an early stage of the driving when the driving of the motor is resumed after being stopped. Accordingly, it is possible to prevent application of torque in an unnecessary position, thereby improving driving efficiency of the motor and fuel efficiency of the vehicle.

Furthermore, the method of controlling a sensorless motor for an air compressor according to the present disclosure can overcome a rotor alignment failure problem in that a rotor may not be aligned to an intended position when the position of the rotor is aligned to a final position estimated by a sensorless control logic when the motor is stopped.

That is, the present disclosure can prevent the position alignment failure that may occasionally occur as illustrated in FIG. 8.

Although the exemplary embodiments of the present disclosure have been described for illustrative purposes, those skilled in the art will appreciate that various modifications, additions and substitutions are possible, without departing from the scope and spirit of the present disclosure as disclosed in the accompanying claims.

The invention claimed is:

1. A method of controlling a sensorless motor for an air compressor, the method comprising:
    performing, by a controller, speed control to stop the motor of the air compressor;
    determining, by the controller, that the motor is in a stopped state in accordance with a speed of the motor estimated by a sensorless control logic while the speed control is being performed;
    determining, by the controller, an alignment target position of a rotor determined by a position of the rotor of the motor finally estimated by the sensorless control logic at a point in time at which the motor is determined to be in the stopped state;
    determining, by the controller, an alignment start position from the alignment target position in accordance with a predetermined alignment offset angle;
    changing, by the controller, the position of the rotor of the motor from the determined alignment start position to the alignment target position; and
    performing, by the controller, sensorless control to drive the motor by setting the alignment target position at an initial position in response to a motor drive request, in a state in which the position of the rotor of the motor is aligned to the alignment target position;
    wherein the controller determines the alignment start position by subtracting the alignment offset angle from the predetermined alignment target position in a direction opposite to a direction of rotation of the rotor.

2. The method according to claim 1, wherein the controller determines that the motor is in the stopped state when the speed of the motor estimated by the sensorless control logic reaches a predetermined reference speed.

3. The method according to claim 2, wherein the reference speed is determined by the controller to be a speed greater than 0 rpm.

4. The method according to claim 1, wherein, when changing the position of the rotor, the controller controls a current applied to the motor to forcibly rotate the rotor for a predetermined forced rotor rotation time so that the position of the rotor of the motor changes from the alignment start position to the alignment target position.

5. The method according to claim 4, wherein the current comprises a phase current, and the controller controls a phase of the phase current applied to the motor so that the position of the rotor of the motor changes from the alignment start position to the alignment target position for the forced rotor rotation time.

6. The method according to claim 5, wherein the controller controls the phase of the phase current applied to the motor so that the position of the rotor of the motor linearly changes at a predetermined rate of change.

7. The method according to claim 5, wherein, when changing the position of the rotor, the controller:
applies a d-axis current for moving the position of the rotor of the motor from the alignment start position to the alignment target position for a predetermined position alignment time from the point in time at which the motor is determined to be in the stopped state; and
after passage of the forced rotor rotation time from the point in time at which the motor is determined to be in the stopped state, stops controlling the phase of the phase current while the d-axis current is being applied before passage of the position alignment time.

8. The method according to claim 4, wherein the controller applies the current to the motor so that the position of the rotor of the motor changes at a predetermined rate of change from the alignment start position to the alignment target position.

9. The method according to claim 4, wherein, when changing the position of the rotor, the controller applies a d-axis current to change the position of the rotor of the motor from the alignment start position to the alignment target position for a predetermined position alignment time.

10. The method according to claim 1, wherein, when changing the position of the rotor, the controller applies a d-axis current to change the position of the rotor of the motor from the alignment start position to the alignment target position for a predetermined position alignment time.

11. The method according to claim 1, further comprising using the air compressor in a fuel cell system to supply air to a fuel cell stack.

12. A method of controlling a sensorless motor for an air compressor, the method comprising:
performing, by a controller, speed control to stop the motor of the air compressor;
determining, by the controller, that the motor is in a stopped state in accordance with a speed of the motor estimated by a sensorless control logic while the speed control is being performed;
determining, by the controller, an alignment target position of a rotor determined by a position of the rotor of the motor finally estimated by the sensorless control logic at a point in time at which the motor is determined to be in the stopped state;
determining, by the controller, an alignment start position from the alignment target position in accordance with a predetermined alignment offset angle;
changing, by the controller, the position of the rotor of the motor from the determined alignment start position to the alignment target position; and
performing, by the controller, sensorless control to drive the motor by setting the alignment target position at an initial position in response to a motor drive request, in a state in which the position of the rotor of the motor is aligned to the alignment target position,
wherein the controller determines the alignment start position by subtracting the alignment offset angle from the predetermined alignment target position in a direction opposite to a direction of rotation of the rotor;
wherein a rate of change in the position of the rotor from the alignment start position to the alignment target position is defined by Formula 1:
Rate of change in position of rotor=(Alignment offset angle)/(Forced rotor rotation time), and the position of the rotor between the alignment start position and the alignment target a position is estimated by Formula 2:
Estimated position=Alignment start position+(Rate of change XTime counted).

* * * * *